(12) United States Patent
Harris et al.

(10) Patent No.: US 10,719,799 B1
(45) Date of Patent: Jul. 21, 2020

(54) VIRTUAL MANAGEMENT SYSTEMS AND METHODS

(71) Applicant: JPMorgan Chase Bank, N.A., New York, NY (US)

(72) Inventors: William V. Harris, New York, NY (US); Jonathan B. Teplitz, New York, NY (US); Ganesh Murugan, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 102 days.

(21) Appl. No.: 14/209,284

(22) Filed: Mar. 13, 2014

Related U.S. Application Data

(60) Provisional application No. 61/792,696, filed on Mar. 15, 2013.

(51) Int. Cl.
*G06Q 10/06* (2012.01)

(52) U.S. Cl.
CPC . *G06Q 10/06398* (2013.01); *G06Q 10/06311* (2013.01); *G06Q 10/06393* (2013.01); *G06Q 10/063112* (2013.01); *G06Q 10/063114* (2013.01)

(58) Field of Classification Search
CPC ..... G06Q 10/06398; G06Q 10/063112; G06Q 10/063114; G06Q 10/06393; G06Q 10/06311
USPC .................... 705/7.42, 7.39, 7.13, 7.14, 7.15
See application file for complete search history.

(56) References Cited

U.S. PATENT DOCUMENTS

| | | | | |
|---|---|---|---|---|
| 7,668,849 B1* | 2/2010 | Narancic | ............. | G06F 17/3089 707/811 |
| 2008/0184349 A1* | 7/2008 | Ting | ..................... | H04L 9/3231 726/7 |
| 2009/0012760 A1* | 1/2009 | Schunemann | ......... | G06Q 10/06 703/6 |
| 2013/0110565 A1* | 5/2013 | Means, Jr. | ........... | G06Q 10/063 705/7.11 |
| 2013/0173351 A1* | 7/2013 | Livne | ............... | G06Q 10/06398 705/7.38 |

OTHER PUBLICATIONS

Imprivata and Lenel Partner to Offer Converged Physical—Logical Enterprise Security Access Solution, Business Wire (Year: 2006).*

\* cited by examiner

*Primary Examiner* — Charles Guiliano
(74) *Attorney, Agent, or Firm* — Greenblum & Bernstein, P.L.C.

(57) ABSTRACT

A computer-implemented method and system are provided for optimizing resource usage, wherein the resources include employees of an organization. The method includes collecting employee data including structured data and unstructured data through multiple input channels over at least one network and storing the employee data collected over the multiple input channels in at least one computer memory. The method further includes accessing the computer memory using at least one computer processor and executing instructions to perform multiple operations on the stored data. The operations include transforming the unstructured data into structured data and disambiguating the structured data. The operations additionally include applying rule sets to the transformed data and the structured data to derive a digital productivity footprint for each employee and analyzing the derived digital footprints to optimize resource usage.

14 Claims, 44 Drawing Sheets

| 910 SID | 920 SKILL | 926 SYSTEM | 930 RESOLUTION CODE | 940 INCIDENT VOLUME | 950 P1SX VOLUME | 960 LEVEL E MANAGER | 970 COUNTRY | 976 CITY | 980 WORKER TYPE | 990 VENDOR |
|---|---|---|---|---|---|---|---|---|---|---|
| 1125408 | DATABASE | CAS | BACKUP | 2 | 0 | AMIT GUPTA | INDIA | HYDERABAD | E | EMPLOYEE |
| | | | OTHER | 2 | 0 | AMIT GUPTA | INDIA | HYDERABAD | E | EMPLOYEE |
| | | DESKTOP | OTHER | 1 | 0 | AMIT GUPTA | INDIA | HYDERABAD | E | EMPLOYEE |
| | | IOC | BACKUP | 3 | 0 | AMIT GUPTA | INDIA | HYDERABAD | E | EMPLOYEE |
| | ORACLE | CAS | FILE SYSTEM | 13 | 0 | AMIT GUPTA | INDIA | HYDERABAD | E | EMPLOYEE |
| | | | MONITORING | 6 | 0 | AMIT GUPTA | INDIA | HYDERABAD | E | EMPLOYEE |
| | | | OTHER | 1 | 0 | AMIT GUPTA | INDIA | HYDERABAD | E | EMPLOYEE |
| | SQL | DESKTOP | OTHER | 1 | 0 | AMIT GUPTA | INDIA | HYDERABAD | E | EMPLOYEE |
| | | | SECURITY/ACCESS | 2 | 0 | AMIT GUPTA | INDIA | HYDERABAD | E | EMPLOYEE |
| | | SQL SERVER | FILE SYSTEM | 1 | 0 | AMIT GUPTA | INDIA | HYDERABAD | E | EMPLOYEE |
| | | WEBSPAN | FILE SYSTEM | 8 | 0 | FILE SYSTEM | INDIA | HYDERABAD | E | EMPLOYEE |
| | | | OTHER | 3 | 0 | AMIT GUPTA | INDIA | HYDERABAD | E | EMPLOYEE |
| W465004 | DATABASE | CAS | BACKUP | 1 | 0 | BRIAN ZITTERHOPF | UNITED STATES | HOUSTON | C | COMSYS |
| | | | CONFIGURATION | 1 | 0 | BRIAN ZITTERHOPF | UNITED STATES | HOUSTON | C | COMSYS |
| | | DESKTOP | CONFIGURATION | 4 | 0 | BRIAN ZITTERHOPF | UNITED STATES | HOUSTON | C | COMSYS |
| | | | OTHER | 6 | 0 | BRIAN ZITTERHOPF | UNITED STATES | HOUSTON | C | COMSYS |
| | | IOC | BACKUP | 5 | 0 | BRIAN ZITTERHOPF | UNITED STATES | HOUSTON | C | COMSYS |
| | | | CONFIGURATION | 1 | 0 | BRIAN ZITTERHOPF | UNITED STATES | HOUSTON | C | COMSYS |
| | | | OTHER | 2 | 0 | BRIAN ZITTERHOPF | UNITED STATES | HOUSTON | C | COMSYS |
| | | TIVOLI | OTHER | 1 | 0 | BRIAN ZITTERHOPF | UNITED STATES | HOUSTON | C | COMSYS |
| | ORACLE | CAS | BACKUP | 1 | 0 | BRIAN ZITTERHOPF | UNITED STATES | HOUSTON | C | COMSYS |
| | | | CONFIGURATION | 7 | 0 | BRIAN ZITTERHOPF | UNITED STATES | HOUSTON | C | COMSYS |
| | | | OTHER | 7 | 0 | BRIAN ZITTERHOPF | UNITED STATES | HOUSTON | C | COMSYS |
| | | DESKTOP | CONFIGURATION | 4 | 0 | BRIAN ZITTERHOPF | UNITED STATES | HOUSTON | C | COMSYS |
| | | | OTHER | 6 | 0 | BRIAN ZITTERHOPF | UNITED STATES | HOUSTON | C | COMSYS |
| | | HALO | BACKUP | 2 | 0 | BRIAN ZITTERHOPF | UNITED STATES | HOUSTON | C | COMSYS |
| | | IOC | CONFIGURATION | 32 | 0 | BRIAN ZITTERHOPF | UNITED STATES | HOUSTON | C | COMSYS |
| | | | OTHER | 23 | 0 | BRIAN ZITTERHOPF | UNITED STATES | HOUSTON | C | COMSYS |
| | OTHER | DESKTOP | CONFIGURATION | 83 | 0 | BRIAN ZITTERHOPF | UNITED STATES | HOUSTON | C | COMSYS |
| | SYBASE | DESKTOP | OTHER | 1 | 0 | BRIAN ZITTERHOPF | UNITED STATES | HOUSTON | C | COMSYS |
| | | IOC | OTHER | 3 | 0 | BRIAN ZITTERHOPF | UNITED STATES | HOUSTON | C | COMSYS |

SYBASE BY LOCATION

| sid | BANGALORE | DALLAS | CITY HOUSTON | MUMBAI | WILMINGTON |
|---|---|---|---|---|---|
| E374562 | | | ● | | |
| E447262 | | | | ● | |
| E498282 | | | | ● | |
| I087668 | ● | | | | |
| I349632 | | | | ● | |
| I471246 | | | | ● | |
| O551534 | | | ● | | |
| O560240 | | | | | ● |
| R055834 | | | ● | ● | |
| R064188 | | | ● | ● | |
| R294925 | | | | ● | |
| R509045 | | | ● | | |

*FIG. 9B*

DATABASE/FILE SYSTEM REPAIR BY LOCATION

| sid | BANGALORE | CHENNAI | DALLAS | HYDERABAD | MUMBAI | NEW YORK | SANTIAGO |
|---|---|---|---|---|---|---|---|
| E403381 | ● | | | | | | |
| E560449 | | ● | | | | | |
| E592409 | | | | ● | | | |
| I125408 | | | | ● | | | |
| J986193 | ● | | | | | | |
| N440581 | | | | | ● | | |
| O022155 | | | | | | ● | |
| O557877 | | ● | | | | | |
| R311066 | | ● | | | | | |

FIG. 9C

ATTENDANCE / ARRIVAL TIME 1000

LEGEND

| SB | SMART BUTTON |
| BS | BADGE SWIPE |
| DF | DIGITAL PROFILE |

| 1010 METRIC | 1012 DESCRIPTION | 1014 CALCULATION |
|---|---|---|
| DF START OF DAY | EMPLOYEE AVERAGE ARRIVAL TIME TO WORK BASED ON THE 1ST BS OR VPN PLUS SB | TIMESTAMP OF BS + SB OR VPN +SB |
| DF HOURS / DAY | EMPLOYEE DIGITAL AVERAGE WORKDAY LENGTH BEGINNING WITH ARRIVAL TIME AND SEGMENTED INTO ACTIVE AND INACTIVE PERIODS | DF START OF DAY + SB ACTIVE TIME - SB INACTIVE TIME |
| DF HOURS / WEEK | EMPLOYEE DIGITAL AVERAGE WORKDAY LENGTH OVER A WORK WEEK | SUM OF DF HOURS / DAY FROM MONDAY 00:00 TO SUNDAY 23:59 |
| DF ATTENDANCE - ONSITE | EMPLOYEE ONSITE ACTIVITY ON A GIVEN DAY | BS + SB |
| DF ATTENDANCE - REMOTE | EMPLOYEE REMOTE ACTIVITY ON A GIVEN DAY | VPN + SB |
| DF ATTENDANCE | EMPLOYEE ACTIVELY WORKING, EITHER REMOTELY OR ONSITE | DF ATTENDANCE - ONSITE OR DF ATTENDANCE - REMOTE |
| DF ATTENDANCE - NO ACTIVITY | NO EMPLOYEE DIGITAL ACTIVITY FOR A GIVEN DAY | |
| PRIMARY BUILDING | BUILDING LOCATION WITH THE MOST BADGE SWIPES PER EMPLOYEE, ON A GIVEN DAY | BUILDING LOCATION WITH GREATEST NUMBER OF BADGE SWIPES; IF EQUAL, THE BUILDING LOCATION WITH THE FIRST BADGE SWIPE |

ACTIVITY ANALYSIS 1020

| 1010 METRIC | 1012 DESCRIPTION | 1014 CALCULATION |
|---|---|---|
| EMAIL ACTIVITY | TOTAL COUNT OF EMPLOYEE INTERNAL AND EXTERNAL EMAIL ACTIVITY ON A GIVEN DAY | INTERNAL EMAILS SENT COUNT + EXTERNAL EMAILS SENT COUNT |
| FIRST BADGE SWIPE | EMPLOYEE FIRST BADGE SWIPE TIMESTAMP AFTER 3AM ON A GIVEN DAY | TIMESTAMP OF FIRST BS AFTER 3 AM |
| FIRST WINDOWS LOGIN | EMPLOYEE FIRST SB LOGIN TIMESTAMP AFTER 3AM ON A GIVEN DAY | TIMESTAMP OF FIRST SB AFTER 3 AM |
| WINDOWS LOGIN / UNLOCK | COUNT OF EMPLOYEE SB LOGIN ACTIVITY ON A GIVEN DAY | |
| WINDOWS LOGOUT / LOCKOUT | COUNT OF EMPLOYEE SB LOGOUT ACTIVITY ON A GIVEN DAY | |

LEGEND

| SB | SMART BUTTON |
|---|---|
| BS | BADGE SWIPE |
| DF | DIGITAL FOOTPRINT |

WORKDAY LENGTH 1030

| 1010 METRIC | 1012 DESCRIPTION | 1014 CALCULATION |
|---|---|---|
| DF HOURS / DAY | EMPLOYEE DIGITAL AVERAGE WORKDAY LENGTH BEGINNING WITH ARRIVAL TIME AND SEGMENTED INTO ACTIVE AND INACTIVE PERIODS | DF START OF DAY + SB ACTIVE TIME - SB INACTIVE TIME |
| DF HOURS / WEEK | EMPLOYEE DIGITAL AVERAGE WORKDAY LENGTH OVER A WORK WEEK | SUM OF DF HOURS / DAY FROM MONDAY 00:00 TO SUNDAY 23:59 |
| TAS HOURS / WEEK | TOTAL SELF-REPORTED EMPLOYEE TAS HOURS OVER A WORK WEEK | SUM OF TAS HOURS FROM MONDAY 00:00 TO SUNDAY 23:59 (TAS REGULAR + TAS STRAIGHT + TAS OVERTIME) |
| TAS OVERTIME HOURS | TOTAL SELF-REPORTED EMPLOYEE TAS HOURS NOT INCLUDING TAS REGULAR HOURS | TAS STRAIGHT + TAS OVERTIME |
| OVER-REPORTED HOURS | TOTAL SELF-REPORTED EMPLOYEE TAS HOURS IN EXCESS OF EMPLOYEE DF HOURS | TAS HOURS / WEEK > DF HOURS / WEEK |
| UNDER-REPORTED HOURS | TOTAL EMPLOYEE DF HOURS IN EXCESS OF SELF-REPORTED EMPLOYEE TAS HOURS | DF HOURS / WEEK > TAS HOURS / WEEK |
| OVERTIME COST | DOLLAR AMOUNT OF EMPLOYEE TAS OVERTIME HOURS | PAY STRAIGHT AMOUNT + PAY OVERTIME AMOUNT |

FIG. 10C

LOCATION 1040

| 1010 METRIC | 1012 DESCRIPTION | 1014 CALCULATION |
|---|---|---|
| DF ATTENDANCE - ONSITE | EMPLOYEE ONSITE ACTIVITY ON A GIVEN DAY | BS + SB |
| DF ATTENDANCE - REMOTE | EMPLOYEE REMOTE ACTIVITY ON A GIVEN DAY | VPN + SB |
| DF ATTENDANCE | EMPLOYEE ACTIVELY WORKING, EITHER REMOTELY OR ONSITE | DF ATTENDANCE - ONSITE OR DF ATTENDANCE - REMOTE |
| DF ATTENDANCE - NO ACTIVITY | NO EMPLOYEE DIGITAL ACTIVITY FOR A GIVEN DAY | |
| PRIMARY BUILDING | BUILDING LOCATION WITH THE MOST BADGE SWIPES PER EMPLOYEE, ON A GIVEN DAY | BUILDING LOCATION WITH GREATEST NUMBER OF BADGE SWIPES; IF EQUAL, THE BUILDING LOCATION WITH THE FIRST BADGE SWIPE |
| ATTENDANCE MAX | GREATEST NUMBER OF EMPLOYEES IN ATTENDANCE AT A LOCATION FOR A GIVEN DAY OVER A GIVEN TIME PERIOD | |

*FIG. 10D*

REMOTE VS ONSITE ATTENDANCE

| TOTAL POPULATION | ONSITE ATTENDANCE | | REMOTE ATTENDANCE | | NO ACTIVITY | | TOTAL COUNT |
|---|---|---|---|---|---|---|---|
| | % | COUNT | % | COUNT | % | COUNT | |
| 9/3 – 9/9 | 80.1% | 659 | 8.0% | 66 | 11.9% | 98 | 822 |
| 9/10-9/16 | 80.8% | 665 | 8.2% | 68 | 11.0% | 91 | 823 |
| 9/17-9/23 | 79.9% | 661 | 8.9% | 73 | 11.3% | 93 | 827 |
| 9/24-9/30 | 80.7% | 671 | 8.4% | 70 | 10.9% | 91 | 831 |
| 10/1-10/7 | 80.8% | 674 | 7.8% | 65 | 11.4% | 95 | 835 |
| 10/8-10/14 | 80.4% | 675 | 8.2% | 68 | 11.5% | 96 | 840 |
| 10/15-10/21 | 80.1% | 680 | 8.3% | 70 | 11.7% | 99 | 849 |
| 10/22-10/28 | 79.5% | 681 | 9.5% | 82 | 11.0% | 94 | 857 |
| 10/29-11/4 | 41.0% | 351 | 29.1% | 249 | 29.9% | 256 | 855 |
| 11/5-11/11 | 58.7% | 501 | 26.4% | 225 | 14.9% | 127 | 854 |
| 11/12-11/18 | 67.6% | 576 | 20.1% | 172 | 12.3% | 104 | 852 |
| 11/19-11/25 | 53.6% | 456 | 24.7% | 211 | 21.7% | 185 | 852 |
| 11/26-12/2 | 68.5% | 585 | 20.3% | 173 | 11.2% | 96 | 854 |
| 12/3-12/9 | 69.6% | 592 | 19.2% | 164 | 11.1% | 95 | 851 |
| 12/10-12/16 | 67.8% | 578 | 18.9% | 161 | 13.3% | 113 | 853 |
| 12/17-12/23 | 61.1% | 518 | 21.5% | 182 | 17.4% | 147 | 847 |
| 12/24-12/30 | 28.8% | 244 | 25.6% | 217 | 45.5% | 385 | 845 |

FIG. 14A

EMPLOYEE ARRIVAL TIME

| OFFICE NAME | OFFICE SIZE | AVG. ARRIVAL TIME | # ARRIVING AFTER 8 | % ARRIVING AFTER 8 | # ARRIVING AFTER 9 | % ARRIVING AFTER 9 | # ARRIVING AFTER 10 | % ARRIVING AFTER 10 |
|---|---|---|---|---|---|---|---|---|
| 10790 RANCHO BERNARDO RD | 410 | 07:29 | 114 | 28% | 109 | 27% | 86 | 21% |
| FREEPORT IV | 389 | 07:26 | 50 | 13% | 6 | 2% | 5 | 1% |
| SKY HARBOR OPERATIONS CENTER | 386 | 07:31 | 111 | 29% | 42 | 11% | 20 | 5% |
| LAKE VISTA 7 - LEWISVILLE | 381 | 07:28 | 75 | 20% | 31 | 8% | 12 | 3% |
| WM3049 ARL/SOUTH COLLINS STRE | 321 | 07:19 | 32 | 10% | 2 | 1% | 2 | 1% |
| CHASE CENTER COLUMBUS | 287 | 08:01 | 65 | 23% | 27 | 9% | 16 | 6% |
| WM4645 FLORENCE | 276 | 08:23 | 177 | 64% | 62 | 22% | 16 | 6% |
| 8333 RIDGEPOINT DRIVE @ AIRPOR | 266 | 07:47 | 69 | 26% | 32 | 12% | 15 | 6% |
| WM5602 HORIZONS BLDG | 245 | 07:30 | 57 | 23% | 11 | 4% | 5 | 2% |
| FSI-4915 INDEPENDENCE PKW | 238 | 08:13 | 153 | 64% | 21 | 9% | 5 | 2% |
| TOTAL | 5,036 | 07:43 | 1,399 | 28% | 538 | 11% | 326 | 6% |

FIG. 15

ATTENDANCE BY PRIMARY LOCATION

| LOCATION | # SIDS | 9/3-9/9 | 9/10-9/16 | 9/17-9/23 | 9/24-9/30 | 10/1-10/7 | 10/8-10/14 | 10/15-10/21 | 10/22-10/28 | 10/29-11/4 |
|---|---|---|---|---|---|---|---|---|---|---|
| 4 NEW YORK PLAZA | 312 | 89.5% | 90.2% | 89.9% | 90.4% | 88.5% | 90.1% | 90.4% | 90.8% | 58.2% |
| 270 PARK AVENUE | 177 | 85.3% | 89.8% | 90.6% | 91.2% | 90.9% | 90.0% | 91.0% | 92.2% | 68.2% |
| 11500 OUTLOOK STREET | 125 | 91.1% | 89.4% | 88.5% | 86.9% | 88.9% | 85.2% | 87.8% | 86.4% | 90.2% |
| 1111 POLARIS PARKWAY | 82 | 91.4% | 87.2% | 91.5% | 93.0% | 91.3% | 94.7% | 86.6% | 86.2% | 88.3% |
| 575 WASHINGTON BOULEVARD | 40 | 73.0% | 70.4% | 75.2% | 73.6% | 74.5% | 81.1% | 71.0% | 80.7% | 40.1% |
| 10 SOUTH DEERBORN | 30 | 92.0% | 56.3% | 89.6% | 90.4% | 90.0% | 86.9% | 83.3% | 88.9% | 88.6% |
| WORK AT HOME - NEW JERSEY | 15 | 100.0% | 100.0% | 100.0% | 100.0% | 100.0% | - | - | - | - |
| 500 STANTON CHRISTIANA ROAD, C | 10 | 74.1% | 83.0% | 77.0% | 76.7% | 82.5% | 87.5% | 81.1% | 92.0% | 88.0% |
| WORK AT HOME - NEW YORK | 6 | - | - | - | - | - | - | - | - | - |
| 460 POLARIS PKWY | 6 | 90.0% | 50.0% | 64.7% | 84.3% | 84.7% | 85.0% | 83.3% | 80.3% | 80.7% |
| OTHER LOCATIONS (29) | 47 | 86.7% | 84.3% | 64.7% | 83.3% | 73.1% | 77.0% | 78.0% | 81.3% | 70.7% |
| TOTAL | 645 | 84.1% | 86.0% | 88.7% | 83.1% | 84.6% | 88.5% | 88.3% | 80.0% | 70.1% |

FIG. 19

VIRTUAL MANAGER SCOREBOARD

| 2010 | 2020 ATTENDANCE (AVG / DAY) | | 2030 ACTIVITY (AVG / DAY) | | | | 2040 | | |
|---|---|---|---|---|---|---|---|---|---|
| NAME | START OF DAY | DF WORK DAY LENGTH (HOURS) | BADGE SWIPE + VPN ACTIVITY | SSO ACTIVITY | EXTERNAL EMAILS SENT | TOTAL OVERTIME HOURS | PRODUCT- IVITY | PERFORM- ANCE | VM SCORE |
| MORTGAGE BANK BENCHMARK | 07:49 | 8.6 | 3.6 | 127.6 | 4.2 | 64.0 | TBD | TBD | 0.0 |
| MY GROUP | 07:36 | 8.2 | 3.6 | 83.6 | 4.0 | 76.4 | -- | -- | 0.0 |
| LEEBER, SHANNON DYAN | 06:00 | 11.4 | 4.4 | 61.8 | 35.6 | 706.6 | | | 2.9 |
| BROWN, DAREYL K. | 07:35 | 10.5 | 3.6 | 799.3 | 3.5 | 11.0 | | | 2.7 |
| IJEWEMEN, DAVIS A. | 06:01 | 12.1 | 2.5 | 118.3 | 1.9 | 1,011.5 | | | 2.6 |
| ALLYN, SUSAN R. | 06:24 | 8.6 | 1.4 | 29.8 | 41.2 | 508.6 | | | 2.3 |
| EUBANKS, RICHARD HOWARD | 05:31 | 10.4 | 1.4 | 134.2 | 6.8 | 768.9 | | | 2.3 |
| FREEDMAN, HOLLY L. | 05:11 | 10.8 | 1.5 | 162.2 | 4.8 | 665.5 | | | 2.2 |
| TOMIC, GORDANA N/A | 06:30 | 10.7 | 2.9 | 69.2 | 29.8 | 442.8 | | | 2.2 |
| MATHIS, ROBERT | 06:01 | 10.6 | 2.5 | 62.6 | 25.0 | 449.5 | | | 2.1 |
| RADULOVIC, ZORI | 05:53 | 11.5 | 5.9 | 73.2 | 7.3 | 828.0 | | | 2.0 |
| SAO, VICKY C | 04:11 | 10.6 | 3.0 | 139.0 | 3.8 | 553.0 | | | 1.9 |

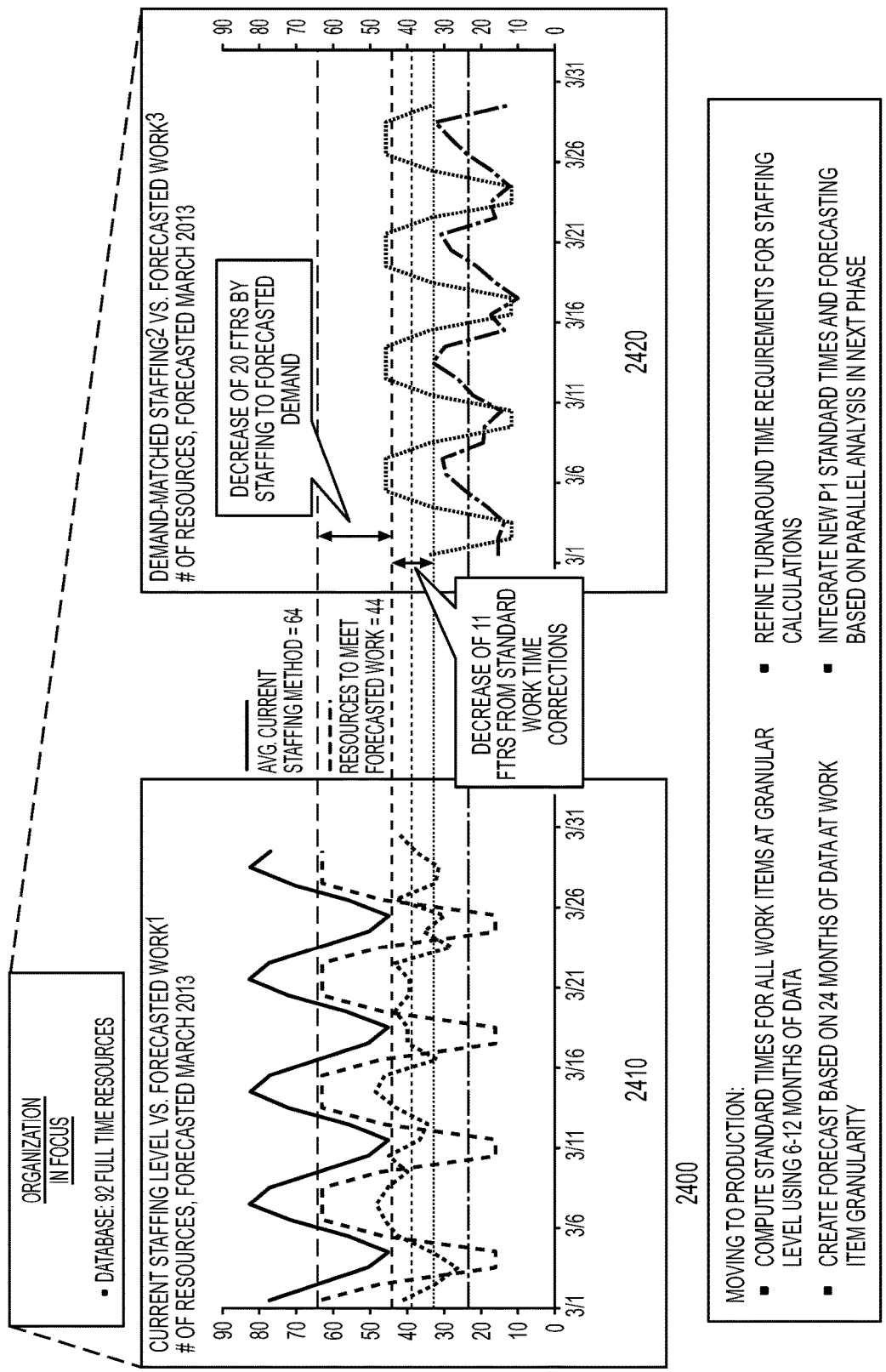

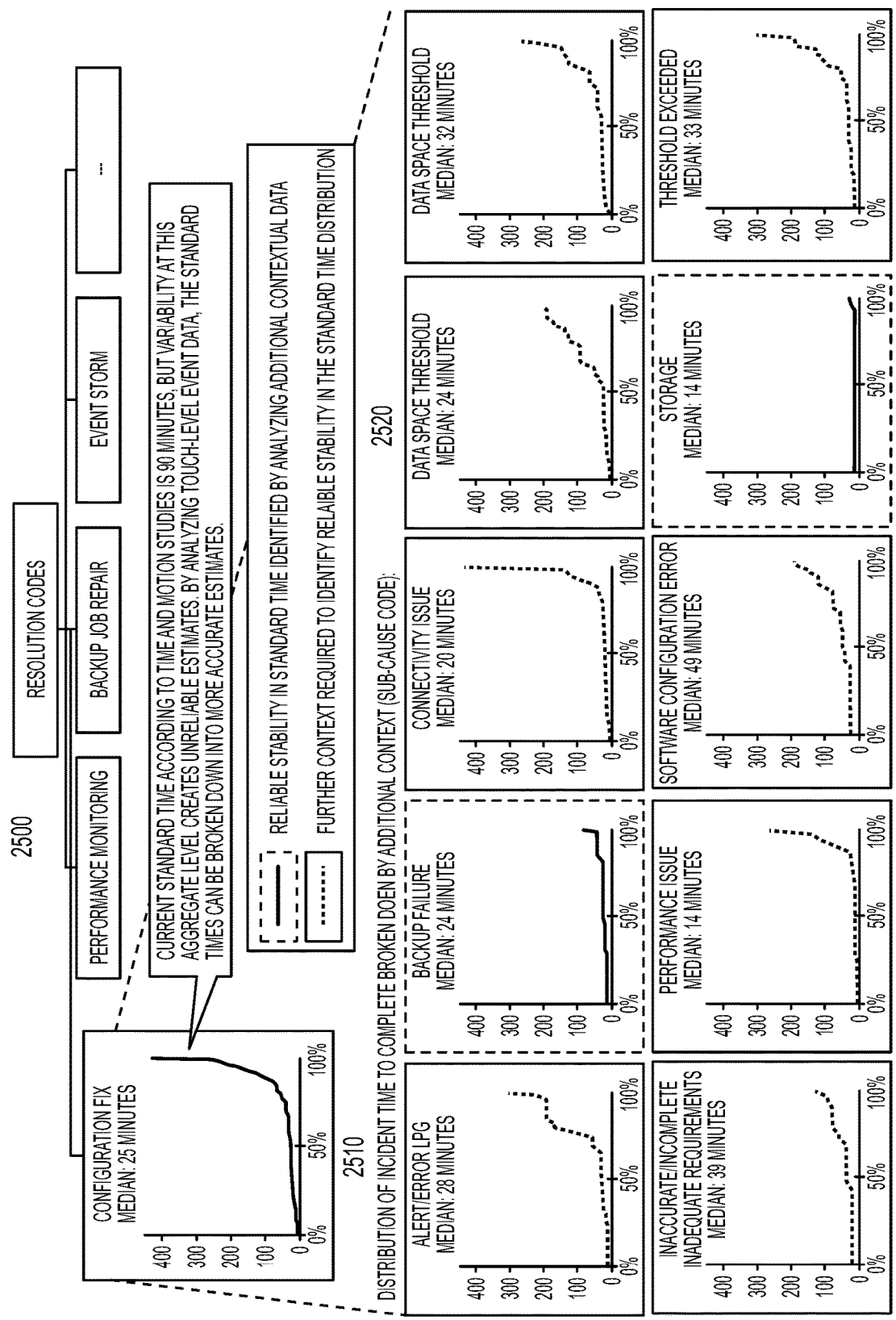

VIRTUAL MANAGEMENT SYSTEMS AND METHODS

RELATED APPLICATIONS

This application claims priority to provisional application Ser. No. 61/792,696 filed on Mar. 15, 2013.

FIELD OF THE INVENTION

Embodiments of the invention relate generally to the fields of data collection and analysis with respect to employee productivity and to resource management.

BACKGROUND

Employers today typically provide employees with numerous corporate electronic devices to perform their job duties. For example, an employer may provide an employee with a laptop, smartphone, and access badge. Recent advancements in information technology ("IT") infrastructure have made it possible for employers to capture how employees use these devices, i.e., their "digital profile". Additionally, organizations typically provide employees with computers that run applications for monitoring employee activities. For example, an employer may compile records of when an employee logs into or out of his or her workstation, when and where an employee remotely logs into or out of the corporate VPN network, when and how often an employee sends e-mails, and the times and locations the employee uses his or her security badges to access a physical location.

Additionally, employers may have alternate methods of monitoring or logging employee activities. For example, employers may perform biometric authentication in order to allow employees to access resources, such as physical areas, systems, or devices.

Though the data recorded from an employee's digital devices captures the use of the device, the data may also be used to determine employee activities and evaluate employee productivity. However, businesses typically find it difficult to analyze the data from each source independently, because the data can occasionally be ambiguous, and therefore an unreliable indicator of employee activity or productivity. For example, using badge swipe data to calculate employee attendance suffers from multiple ambiguities. Badge swipes do not account for employees working remotely or employees hold building doors open for each other, or broken or malfunctioning badge readers. Additionally, computing activity cannot be determined solely based on login activity to an office computing system, as employees are frequently provided with remote access capabilities.

Further, businesses typically find it difficult to aggregate the data from the different data sources for performing advanced employee productivity analysis. Because the digital profile data originates from disparate sources and devices, the digital profile data is typically captured and maintained in different structures. In some cases, the data has no structure at all. For example, records of security badge use, web traffic, anti-virus logs, and firewall logs are typically maintained as textual audit logs created in different formats. Thus, businesses find it difficult to aggregate data from different sources because the multiple data sources are typically maintained in different structures, or lack structure altogether.

Furthermore, even when aggregated, without an effective analysis framework, the collective data is of little use. While businesses have used technology to enhance employee efficiency, no solutions are available that measure efficiency based on device use and develop a plan for reconfiguration of resources based on the measurement. Additional problems exist that may be remedied by embodiments of the invention.

SUMMARY OF THE INVENTION

Embodiments of the invention include a computer-implemented method for analyzing employee productivity based on a plurality of data sets. The method may include capturing employee data from a plurality of data sources and collecting the employee data over at least one computer network. The method additionally includes storing the collected data in at least one storage database in a computer memory and executing instructions on a computer processor to perform multiple steps. The steps include accessing the computer memory and creating structured data based on the stored employee data. The steps additionally include disambiguating the structured data and generating employee metrics based on the disambiguated data.

In another aspect, the invention includes a system for analyzing employee productivity based on a plurality of data sets produced by multiple data sources monitoring employee activities. The system includes a data gathering processor programmed to receive employee data from the plurality of data sources, store the received employee data in a computer memory, and create structured data based on said employee data. The system additionally includes a processing engine including at least one computer processor programmed for disambiguating the structured data and generating employee metrics based on the disambiguated data.

In yet an additional aspect, the invention includes a computer-implemented method for optimizing resource usage, wherein the resources include employees of an organization. The method includes collecting employee data including structured data and unstructured data through multiple input channels over at least one network. The method additionally includes storing the employee data collected over the multiple input channels in at least one computer memory and accessing the computer memory using at least one computer processor for executing instructions to perform operations on the stored data. The operations include transforming the unstructured data into structured data, disambiguating the structured data, applying rule sets to the transformed data and the structured data to derive a digital productivity footprint for each employee, and analyzing the derived digital footprints to optimize resource usage.

BRIEF DESCRIPTION OF THE DRAWINGS

The present invention is described in detail below with reference to the attached drawings:

FIGS. 9A-9C illustrate embodiments of a skills matrix generated by the virtual management system;

FIGS. 10A-10D illustrate an embodiment of a virtual manager metrics library in accordance with an embodiment of the invention;

FIGS. 14A and 14B are charts illustrating remote vs. onsite attendance created by the virtual management system in accordance with embodiments of the invention:

FIG. 15 is a chart illustrating employee arrival metrics created by the virtual management system in accordance with embodiments of the invention;

FIG. 19 is a graph illustrating attendance parameters generated by the virtual management system in accordance with an embodiment of the invention:

FIG. 20 is a virtual manager scorecard produced by the virtual management system in accordance with an embodiment of the invention;

FIG. 24 illustrates additional graphs for resource management generated by the virtual management system in accordance with an embodiment of the invention; and FIG. 25 illustrates additional graphs for resource management generated by the virtual management system in accordance with an embodiment of the invention.

DETAILED DESCRIPTION OF PREFERRED EMBODIMENTS

Embodiments of the virtual management computing system of the invention track employee productivity and efficiency through large-scale collection and analysis of disparate forms of employee data from multiple different and distributed data sources. The collected data may include large unstructured datasets. The virtual management computing system normalizes the collected data into a standard format and creates a digital profile of daily activity for each employee. The usage of these digital profiles and the combination of the disparate data enables visualization of relationships that provide insight into productivity and resource management than the independent data sources.

Figure 1:
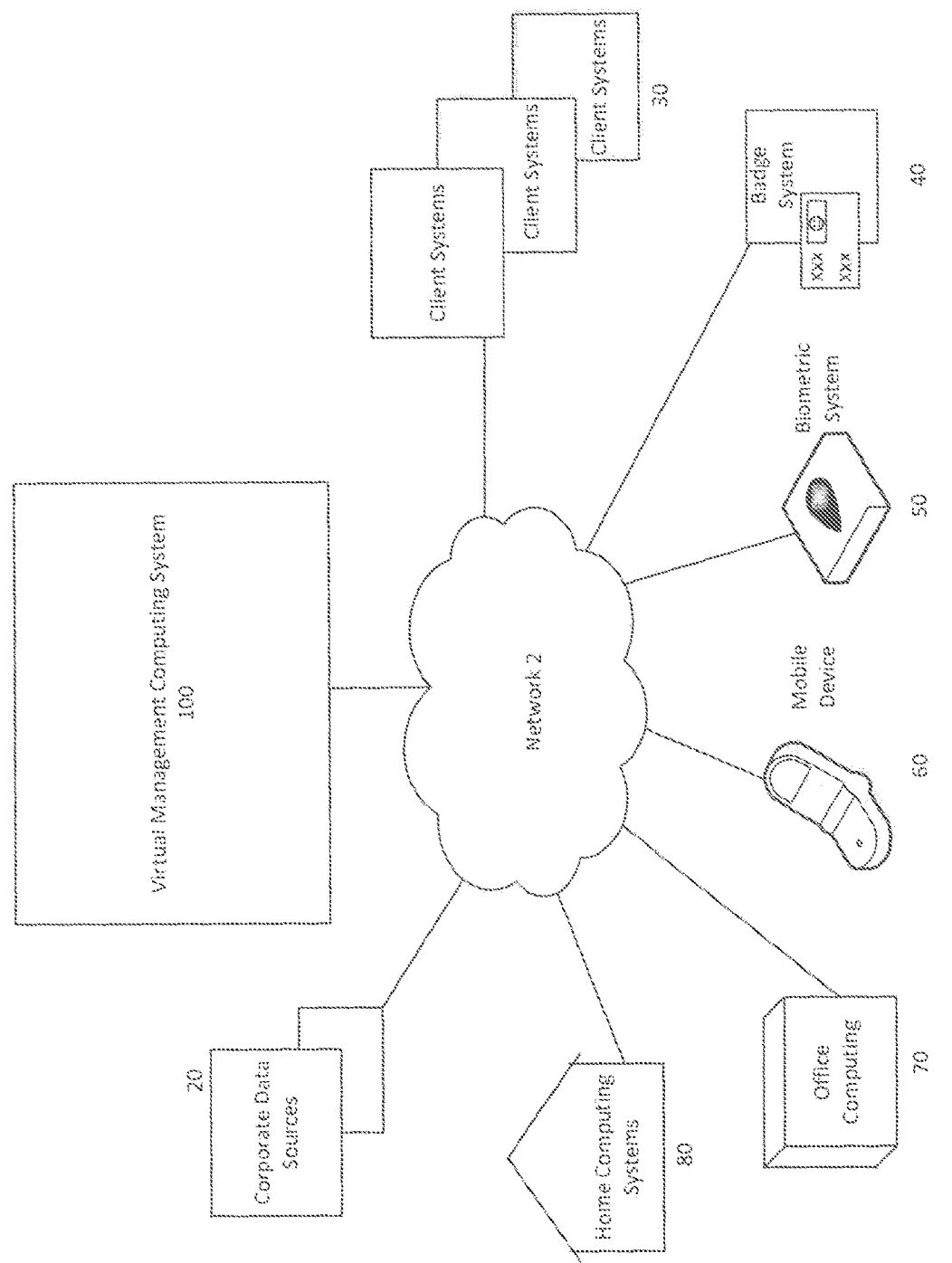
FIG. 1 is a block diagram illustrating an operating environment for operation of the system with an embodiment of the invention.

FIG. 1 is a block diagram illustrating an operating environment for operation of a virtual management computing system 100 in accordance with an embodiment of the invention. The virtual management computing system 100 is connected over one or more networks 2 with various systems and devices. The devices and systems may include, for example, corporate data sources 20, home computing systems 80, office computing systems 70, mobile devices 60, biometric systems 50, security systems 40, and client systems 30. These source and destination systems that interact with the virtual management computing system 100 are merely exemplary. Additional systems or devices may be included in the operating environment.

The network 2 is preferably the Internet, but may be or include other types of networks. Furthermore, even though only one network is shown, multiple networks may be used. For example, corporate data sources 20 may communicate over a different network with the virtual management computing system 100 than the client systems 30. The network 2 may include a wired or wireless local area network (LAN) and a wide area network (WAN), wireless personal area network (PAN) and other types of networks. Computers may be connected over the Internet, an Intranet. Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The corporate data sources 20 may encompass any data sources available within a corporate environment. Many of the corporate data sources track employee computing activity. For example, the corporate data sources may include applications tracking external and internal email activity to or from a corporate email address. Furthermore, systems connected to a desktop computer in the office which require login/logout and screen save lock/unlock may be utilized to gather data. These desktop login systems include, for example, Smart Button™ (SB). The corporate data sources may also include application tracking systems, such as Systrack™, that tracks machine level events, such as application usage time. Furthermore, many administrators now use web tracking systems, such as Proxy Log™, that track employee activity on an Intranet and the Internet. These web tracking systems may also operate as corporate data sources. Computer security systems, such as SEP™ may act as corporate data sources by providing anti-virus, firewall, and removable media information. Additionally, enterprise security management systems, such as Picture Perfect™ and single sign-on security systems (SSO) may also function as data sources.

The corporate data sources 20 may also include building information systems that store building information, such as GREDL™. The building information system may track building capacity and building utilization. Additionally, badge swipe and biometric systems may provide data as they track entry and exit of employees from buildings, floors, rooms, and complexes.

Technology cost systems may also function as corporate data sources 20 by providing employee cost data. Related corporate data sources 20 may provide employee pay data. Worker information systems (WIS) may function as a source of employee and consultant personnel information. The worker information systems typically store data such as location, phone number, email address, job title, etc.

Additional corporate data sources 20 include remote access systems and devices, such as VPN systems. These systems may track and provide employee remote login in formation.

Yet other types of corporate data sources 20 include self-reporting systems, such as time and attendance systems (TAS) in which employees self-report their time. The time may include specific task data as well as a specific amount of time spent on each task.

Other corporate data sources 30 may include specific line of business (LOB) data sources, as typically, each line of business within an organization may have multiple applications that can be utilized to determine employee daily activity and expertise.

The client systems 30 may include computing systems adapted to utilize visualizations, reports and recommendations from the virtual management computing system 100. The client systems 30 may be operated by a line of business, by consultants, or by resource managers within a corporation. Client systems 30 may include at least one processor and multiple applications executed by the processor capable of performing desired functions to interact with the virtual management computing system 100. The client systems 30 may include a browser for accessing information provided by the virtual management computing system 100 and other connected systems that offer such functionality over the Internet or any other network. The client systems 30 may additionally be or include mobile systems, such as smart phones, tablets, or other portable computing apparatus. Mobile client systems may execute downloadable applications for operating in conjunction with the virtual management computing system 100. The downloadable applications may be stored in memory and executed by processors on the mobile systems and may provide a plurality of user interfaces.

The badge systems 40 may allow secure entry to a physical location via badge swipe and may store and transmit data including employee badge number and time of swiping to the virtual management computing system 100. As an alternative to badge swipe systems, coded entry systems may also be implemented for entry. In this instance, the code entry system would transmit the time of entry and the code holder information to the virtual management computing system 100.

The biometric systems 50 may include retinal scanners, thumb print systems, or other systems detecting biometric patterns. These biometric systems 50 would record and transmit the time of detection and the employee identity to the virtual management computing system 100.

The mobile devices 60 may include handheld devices including mobile smarphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These mobile devices 60 may be owned and issued by the organization operating the virtual management computing system 100 or by a client system 30 of the virtual management computing system 100. Various corporate data sources 20 described above, such as the login/logout applications, and online activity monitoring applications may be integrated with and may capture data from the mobile devices 60 to transmit to the virtual management computing system 100.

The office computing systems 70 and home computing systems 80 may include mainframe computers, personal computers, desktop or laptop computing systems and the like. The computing systems 70 and 80 may execute downloadable applications for operating in conjunction with the virtual management computing system 100. The downloadable applications may be stored in memory on the computing systems and may include applications for tracking employee activity.

The virtual management computing system 100 may be operated by an organization monitoring its own resources or by on organization managing resources for multiple client organizations. Details of the virtual management computing system 100 are described below with reference to FIGS. 2-5.

Figure 2:
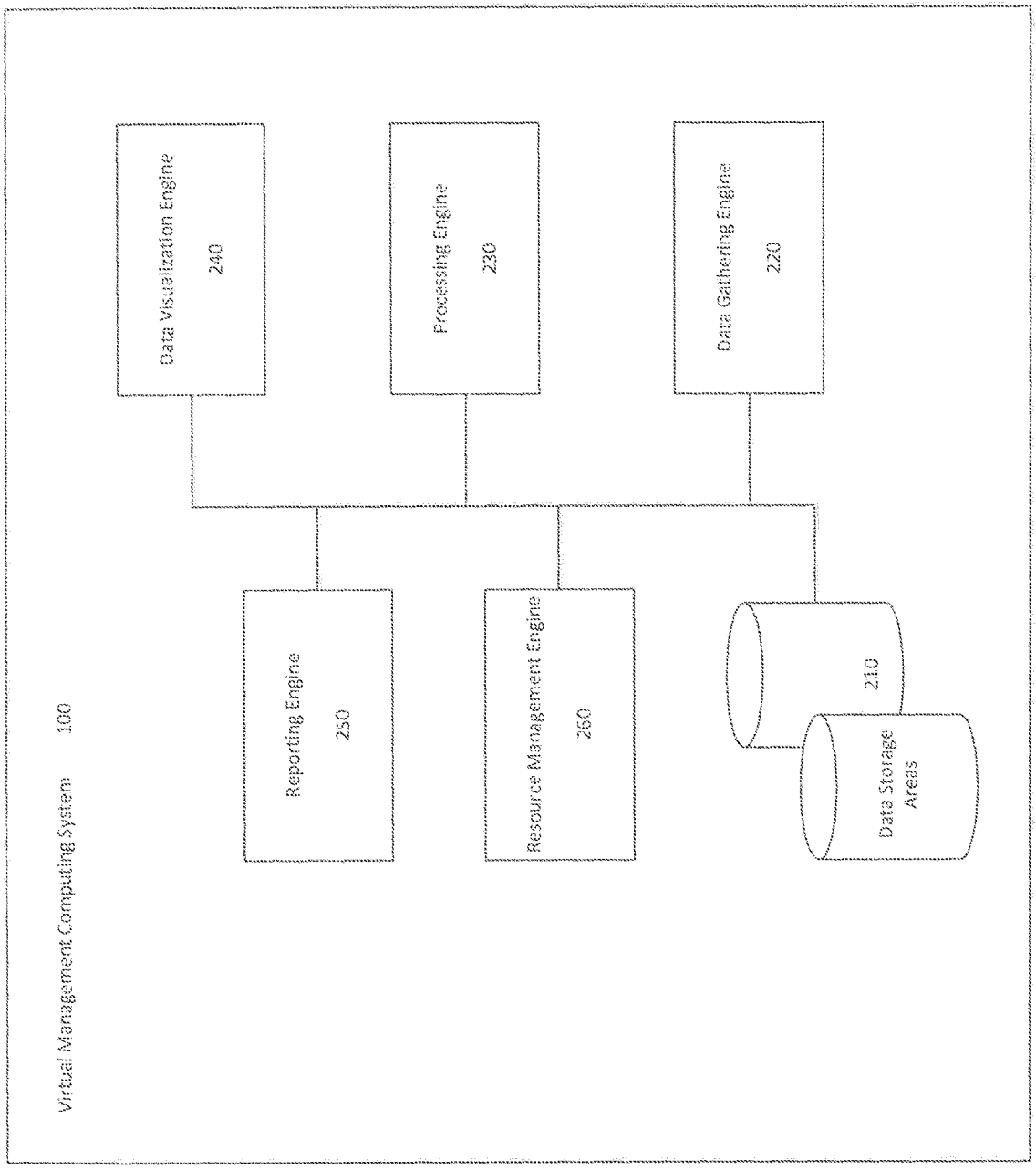
FIG. 2 is a block diagram illustrating a virtual management computing system in accordance with an embodiment of the invention.

FIG. 2 is a block diagram illustrating a virtual management computing system 100 in accordance with an embodiment of the invention. The virtual management computing system 100 may include data storage areas 210, a data gathering engine 220, a processing engine 230, a data visualization engine 240, a reporting engine 250, and a resource management engine 260. The components may be independent computing systems or may be or include software modules stored in a computer memory structure and accessed and executed by one or more computer processors to perform multiple functions. Output from each of the software modules or computing systems may be shared and utilized by other software modules and computing systems illustrated in accordance with embodiments of the invention.

The data storage areas 210 may be or include a computer memory structure capable of storing data. The data storage areas 210 may store data gathered from the corporate data sources, digital profile devices, and other sources described above with respect to FIG. 1. For example, records of security badge use, web traffic, anti-virus logs, firewall logs and removable media activity may be stored in the data storage areas 210. Multiple databases may be stored in the data storage areas 210 and additional databases may store records such as such as anti-virus logs or firewall logs, employee-reported time and attendance. Building information, such as building capacity, or building utilization, worker information, such as employee location, phone number, and manager data may include the costs associated with digital profile devices. The data storage areas 210 may further store LOB data and cost data that indicates the costs associated with employees. For example, from the mortgage LOB, the data storage areas 210 may additionally include data from a borrower assistance default workstation systems. Data from a borrower assistance default workstation system includes receipts and assignments of borrower modifications, which may be used to indicate employee output. This data may be structured, semi-structured, or unstructured. Data from a primary loan origination system, a retail home lending underwriting system, a foreclosure claim processing system, a loan servicing application management system, and a borrower document modification system may also be stored in the data storage areas 210.

The data storage areas 210 may include file systems and databases for storing large amounts of data. For example, the data storage areas may include HP 3PAR StoreServ® Storage systems. Those of ordinary skill in the art will appreciate that other computer storage systems for storing large amounts of data may be implemented. Data stored in the data storage areas 210 may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data.

The data gathering engine 220 collects data from the corporate sources and digital devices as set forth above. The data gathering engine 220 may include or be incorporated in a computer system for receiving and processing large amounts of data across disparate file management systems. In one preferred embodiment of the invention, the data gathering engine receives and processes data across disparate file management systems with a distributed file data management system such as Hadoop®. Those of ordinary skill in the art will appreciate that other distributed file data management systems such as Spark®, HDCC®, and Storm® may be used to receive and process data across disparate file management systems. The data gathering engine 220 executes "extract, transform, and load" ("ETL") procedures to gather data from the data storage areas 210. The data may be structured, semi-structured, and unstructured data from database and the ETL procedures performed by the data gathering engine 220 may include parsing unstructured data. For example, the data gathering engine may parse unstructured data, such as logs of internet traffic or firewall logs. Using parsed data, data gathering engine 220 may aggregate the data for combining and storing in another data storage area or another portion of the data storage area 210.

The processing engine 230 may include or be implemented by a computer processor or computer system for processing data stored in the data storage areas 210 and generating employee metrics. Analysts may interact with the processing engine 230 to enter queries and receive responses through the data visualization engine 240 and reporting engines 250. According to one embodiment of the invention, the processing engine 230 may implement a distributed file data management system such as Hadoop®, similar to the data gathering engine 220 described above. In other embodiments of the invention, the processing engine may be or include a Massively Parallel Processing ("MPP") system, such as Greenplum®, Netezza®, or Vertica®. The processing engine 230 is enabled to generate employee metrics based on the structured data stored in data storage areas 210. In other embodiments of the invention, the processing engine 230 may additionally generate employee metrics based on raw data stored in data storage areas 210.

The processing engine 230 is capable of calculating attendance and time metrics. Attendance and time metrics include metrics such as: start of day based on digital profile, average hours per day based on digital profile, hours per week based on digital profile, attendance onsite based on digital profile, attendance remote based on digital profile, attendance based on digital profile, attendance—no activity based on digital profile, and the primary building location of the employee based on digital profile. The processing engine 230 may also be configured to calculate employee activity metrics. Employee activity metrics include email activity, first badge swipe, first login, login/unlock, and logout/lockout.

In another aspect of the invention, the processing engine 230 is enabled to calculate employee workday length metrics. Employee workday length metrics include average hours per day based on digital profile, hours per week based on digital profile, self-reported employee hours/week, self-reported employee overtime hours, over-reported hours, under-reported hours, and overtime cost.

The processing engine 230 may further be enabled to calculate employee location metrics. Employee location metrics include attendance onsite based on digital profile, attendance remote based on digital profile, attendance based on digital profile, attendance—no activity based on digital profile, the primary building location of the employee based on digital profile, and maximum attendance at a location.

In one aspect of the invention, processing engine 230 eliminates ambiguity in the structured data set for improving accuracy of employee metrics. As described in more detail below, the processing engine 230 may compare data from multiple sources, such as multiple digital profile devices, and multiple data sets from data sources to disambiguate the data. An important advantage to disambiguating the data is improving the accuracy of the employee metrics generated by the processing engine 230. Moreover, storing data from disparate sources into structured data, facilitates businesses' ability to disambiguate data across different sources. That is, in embodiments of the invention, businesses may disambiguate employee data by comparing data from disparate sources, despite the differences in the structures and formats of the data. By aggregating the data into structured data, embodiments of the present invention improve a business's ability to compare and disambiguate different sources of data.

The data visualization engine 240 receives data from the processing engine 230 and presents the data in a visually useful format that facilitates research and analysis. In embodiments of the invention, analysts may enter queries into a user interface and based on output from the processing engine 230, the data visualization engine 240 provides a visual response to the analyst queries. The queries may be entered through client systems 30 or through user interfaces enabled by the virtual management computing system 100 on connected systems or devices. Based on the enabled research and analysis, the virtual management computing system 100 may propose reconfigurations of resources. Data visualization engine 240 includes a computer implemented interface for displaying the employee metrics generated by the processing engine 230. The data visualization engine 240 is enabled to display relationships between multiple employee metrics. In one aspect of the invention, the data visualization engine 240 is enabled to provide employers with a behavior-based early warning system. That is, the data visualization engine 240 may detect trends in the data that serve as indicators for anticipating changes in employee behavior. In another aspect of the invention, the data visualization engine 240 is enabled to provide employers with company-wide performance benchmarking. By gathering data across all employees, the data visualization engine 240 may create benchmarks for smaller groups of employees based on data from larger groups. In another aspect of the invention, the data visualization engine 240 is enabled to provide employers with predictive analytics. In another aspect of the invention, the data visualization engine 240 is enabled to allow employers to manage the allocation of resources to employees based on employee metrics.

The reporting engine 250 generates reports based on the processed data. The reports may be similar to or completely different from the visualizations provided by the visualization engine 240. The reporting engine 250 generates reports based on the employee metrics generated by the processing engine 230. In accordance with one embodiment of the invention, the reporting engine 250 may receive multiple employee metrics and generate a report analyzing an employee's productivity and activity. The report may include graphs displaying the relationships between multiple metrics, behavior-based early warning data, employee benchmarks, and predictive analytics as described above.

The resource management engine 260 may be responsive to additional queries from analysts or may automatically respond to determinations from the processing engine 230 to generate efficient management solutions. For example, after the processing engine 230 determines attendance related factors in response to a query, the resource management engine 260 may be operative to determine how savings can be captured through a different staffing model or flexible work arrangements. Thus, the resource management engine 260 may be responsive to specific queries to provide proposals based on the output of the processing engine 230.

Figure 3:
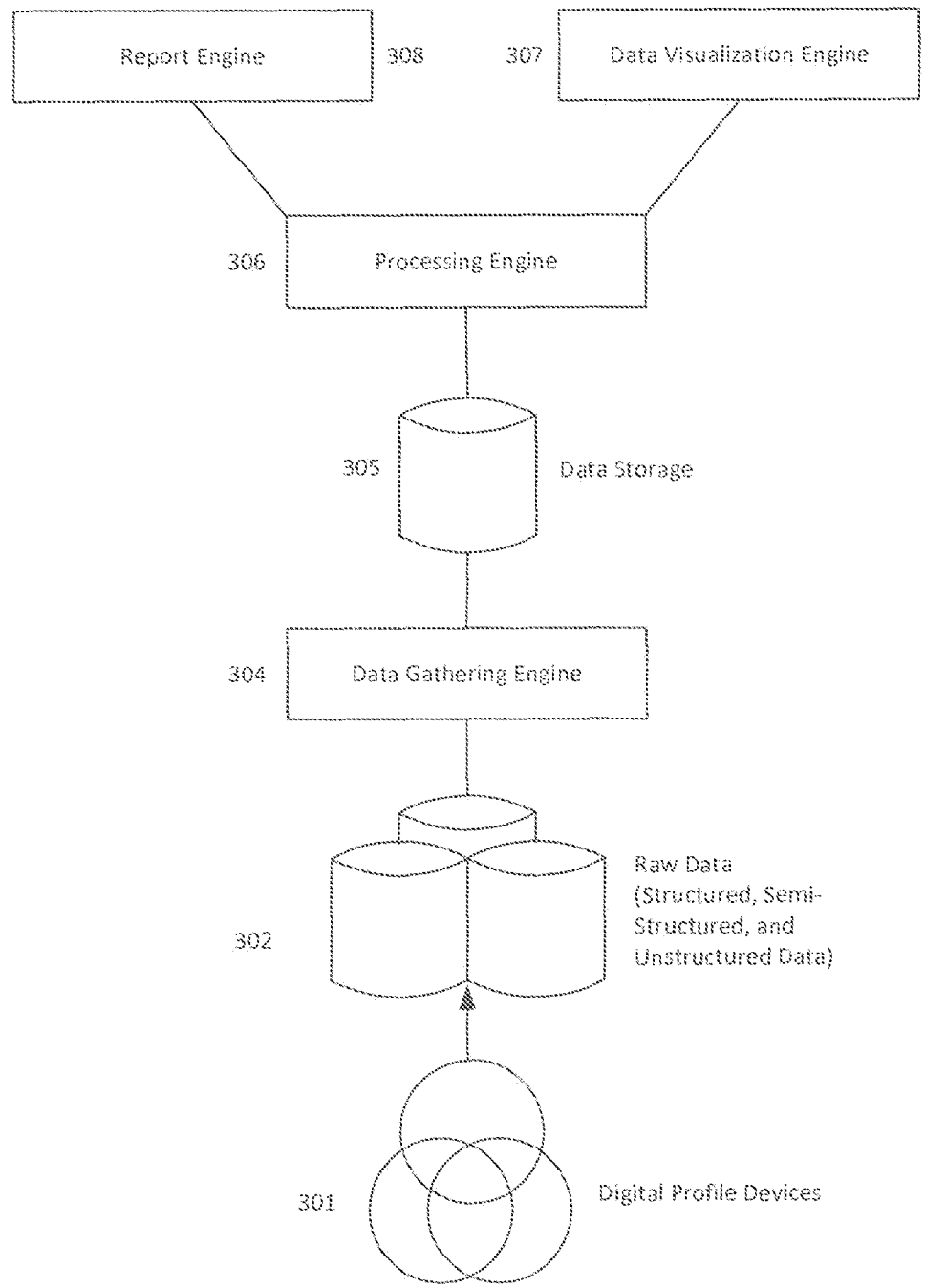
FIG. 3 is a workflow diagram illustrating data flow in accordance with an embodiment of the invention.

FIG. 3 is a workflow diagram illustrating data flow in accordance with an embodiment of the invention. The illustrated data flow facilitates analysis of employee productivity based on a plurality of data sets in accordance with one embodiment of the invention. The system workflow for analyzing employee productivity operates between components including data sources 301 from digital devices and/or other corporate data sources, a storage system for storing structured, semi-structured and unstructured raw data in a file system and database 302, a data gathering engine 304, a data storage area 305, a processing engine 306, a data visualization engine 307, and a reporting engine 308.

In operation, data from digital profile devices 301 is stored in a file system in databases 302 for storing raw data. The data gathering engine 304 gathers the raw data in the file system and database 302 from a plurality of disparate digital profile devices or other corporate data sources as described herein. The data gathering engine 304 further gathers data from file systems and databases storing unstructured, structured and semi-structured data. The data gathering engine 304 combines the data into data storage area 305 applying data cleansing and data summarization logic.

Processing engine 306 processes data in the data storage area 305 to generate employee metrics and is optimized for processing large volumes of data. Data visualization engine 307 provides an interface for visualizing the data stored in file systems and databases 302 and 305 and visualizing employee metrics generated by processing engine 306. Report engine 308 generates reports on employee productivity and activity based on the employee metrics generated at processing engine 306. As set forth above, resource management may also be accomplished based on output from the processing engine.

As set forth above, digital profile devices or other data sources 301 may be or include the devices used by organizations to capture employee data. In accordance with one embodiment of the invention, employee devices may be devices the employer issues to an employee, such as a security badge for accessing buildings or rooms, an employer-issued desktop, an employer-issued laptop, an employer-issued mobile device, or an employer-issued remote VPN device for remotely accessing work materials. These devices are enabled to capture employee data for storing into a file system and database 302. For example, a security badge issued to an employee may store records of the time, date, and location the badge was used to access a building, floor, or particular room. Employers may capture the time, date and location that an employee used his or her badge to enter a building, floor, or particular room in a file system or database 302.

In one aspect of the invention, the digital profile devices may run multiple applications that may further be used to capture additional employee data. For example, while the employee's desktop, laptop, or mobile device may be used to capture the employee's login, logout, and screensaver lock and unlock information, these devices may additionally have email applications that may be used to capture the employee's external and internal email activity. The desktop, laptop, or mobile device may further capture machine level events, such as application usage, and focus time. The devices may further capture web traffic, anti-virus logs, firewall logs and removable media activity.

The data gathering engine 304 relies on a computer processor or a computer system for receiving and processing large amounts of data across disparate file management systems. In one preferred embodiment of the invention, the data gathering engine 304 receives and processes data across disparate file management systems with a distributed file data management system such as Hadoop®. Those of ordinary skill in the art will appreciate that other distributed file data management systems such as Spark®, HDCC®, and Storm® may be used to receive and process data across disparate file management systems. The data gathering engine 304 executes "extract, transform, and load" ("ETL") procedures to gather data from databases 302.

The data gathering engine 304 then stores the processed data in data storage area 305. The data storage area 305 receives aggregated data processed by data gathering engine 304. In one aspect of the invention, the data gathering engine 304 aggregates the different structures of data to be combined into a single data structure. For example, data from an employee's security badge may be combined with log-in/log-out records from an employee's desktop or laptop. According to one embodiment of the invention, the data is transformed into tables having relational fields, and unique employee identifiers across data sources. One advantage to aggregating the data into a single data structure is that employers may use multiple different sources of data to generate employee metrics. Another advantage to aggregating data into a single data structure is that employers may disambiguate or resolve and eliminate ambiguities in the data by comparing data across different sources.

Processing engine 306 implements a computer processor or a computer system for processing data stored in data storage area 305 and generating employee metrics. According to one embodiment of the invention, the processing engine 306 may implement a distributed file data management system such as Hadoop®, similar to the data gathering engine 304 described above. In other embodiments of the invention, the processing engine may be a Massively Parallel Processing ("MPP") system, such as Greenplum®, Netezza®, or Vertical®. The processing engine 306 is enabled to generate employee metrics based on the structured data stored in data storage 305. In other embodiments of the invention, the processing engine 306 may additionally generate employee metrics based on raw data stored in databases 302. Examples of employee metrics the processing engine is enabled to calculate are depicted in FIGS. 7-25.

In one aspect of the invention, the processing engine 306 is enabled to calculate attendance and lime metrics. Attendance and time metrics include metrics such as: start of day based on digital profile, average hours per day based on digital profile, hours per week based on digital profile, attendance onsite based on digital profile, attendance remote based on digital profile, attendance based on digital profile, attendance—no activity based on digital profile, and the primary building location of the employee based on digital profile.

In another aspect of the invention, the processing engine 306 is enabled to calculate employee activity metrics. Employee activity metrics include email activity, first badge swipe, first windows login, windows login/unlock, and windows logout/lockout.

In another aspect of the invention, the processing engine 306 is enabled to calculate employee workday length metrics. Employee workday length metrics include average hours per day based on digital profile, hours per week based on digital profile, self-reported employee hours/week, self-reported employee overtime hours, over-reported hours, under-reported hours, and overtime cost.

In another aspect of the invention, the processing engine 306 is enabled to calculate employee location metrics. Employee location metrics include attendance onsite based on digital profile, attendance remote based on digital profile, attendance based on digital profile, attendance—no activity based on digital profile, the primary building location of the employee based on digital profile, and maximum attendance at a location.

In one aspect of the invention, processing engine 306 eliminates ambiguity in the structured data set for improving accuracy of employee metrics. As described in more detail below, the processing engine may compare data from multiple sources, such as multiple digital profile devices, and multiple data sets from data storage area 302 to disambiguate the data. An important advantage to disambiguating the data is improving the accuracy of the employee metrics generated by the processing engine 306. Moreover, storing data from disparate sources into structured data, facilitates businesses' ability to disambiguate data across different sources. That is, in embodiments of the present invention, businesses may disambiguate employee data by comparing data from disparate sources, despite the differences in the structures and formats of the data. By aggregating the data into structured data, the present invention improves a business's ability to compare and disambiguate different sources of data.

After processing, the data visualization engine 307 displays the employee metrics generated by the processing engine 306. The data visualization engine 307 is enabled to display relationships between multiple employee metrics. FIGS. 7-9 and 11-25 are further described below with respect to the operation of the visualization engine 307. Additionally or alternatively to visualization, the reporting engine 308 may generate reports based on employee metrics generated by the processing engine 306.

Figure 4:
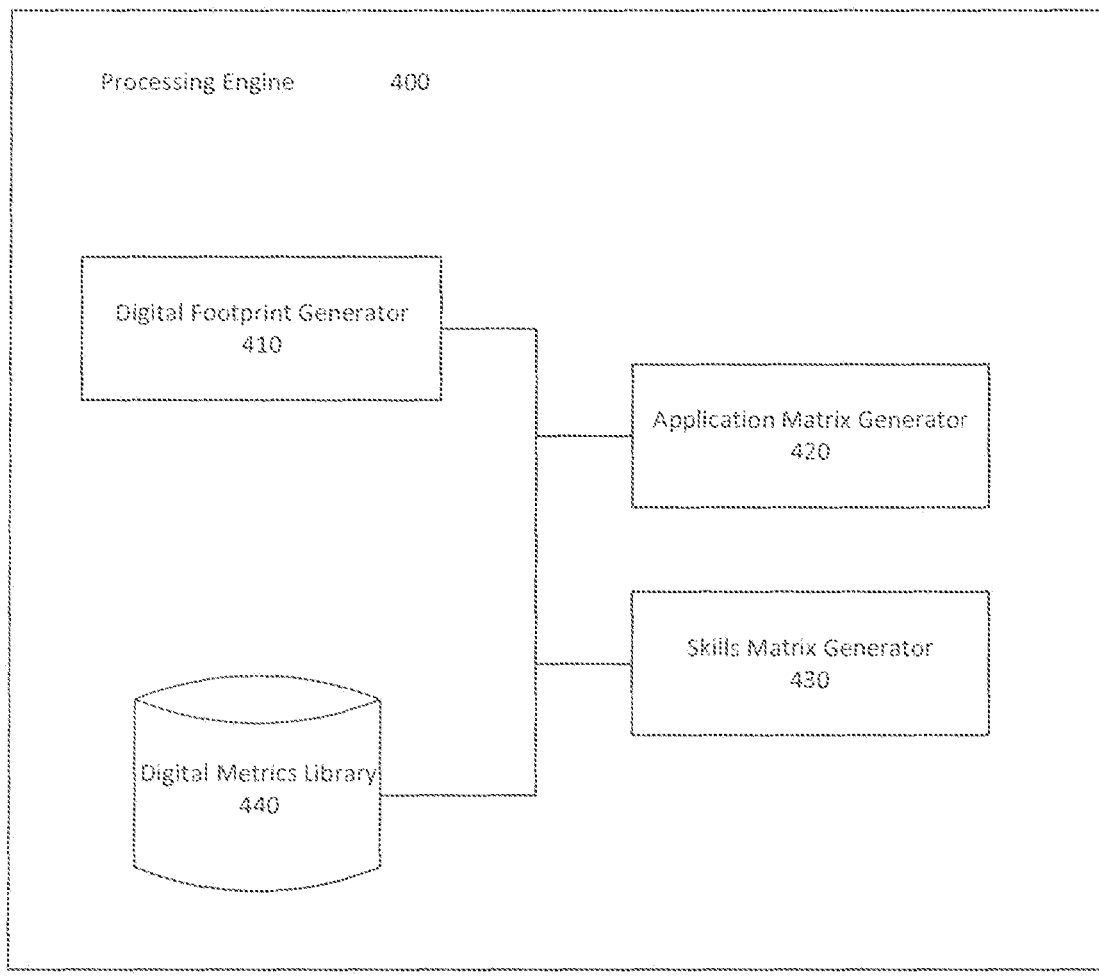
FIG. 4 is a block diagram illustrating a processing engine of the virtual management system in accordance with embodiments of the invention.

FIG. 4 is a block diagram illustrating a processing engine 400 of the virtual management system in accordance with embodiments of the invention. In embodiments of the invention, the processing engine 400 is a computing system and the components illustrated are software routines executed by a processor or the computing system. The processing engine 400 may include a digital footprint generator 410, an application matrix generator 420, and a skills metrics generator 430. The processing engine 400 may also include or access a digital metrics library 440. The digital footprint generator 410 may generate a digital footprint for each employee as will be further described below with reference to FIG. 7. The application matrix generator 420 may produce an application matrix such as that shown in FIG. 8. The skills matrix generator 430 may produce a skills matrix such as that shown in FIG. 9. The processing engine 400 may include additional software components to generate additional analyses. The digital metrics library 440 may store formulas for computation of the metrics for measurement and define their calculations. The metrics library is further described below with reference to FIG. 10. The calculated are metrics are utilized by the components of the processing engine 400 to produce the desired analysis.

Figure 5:
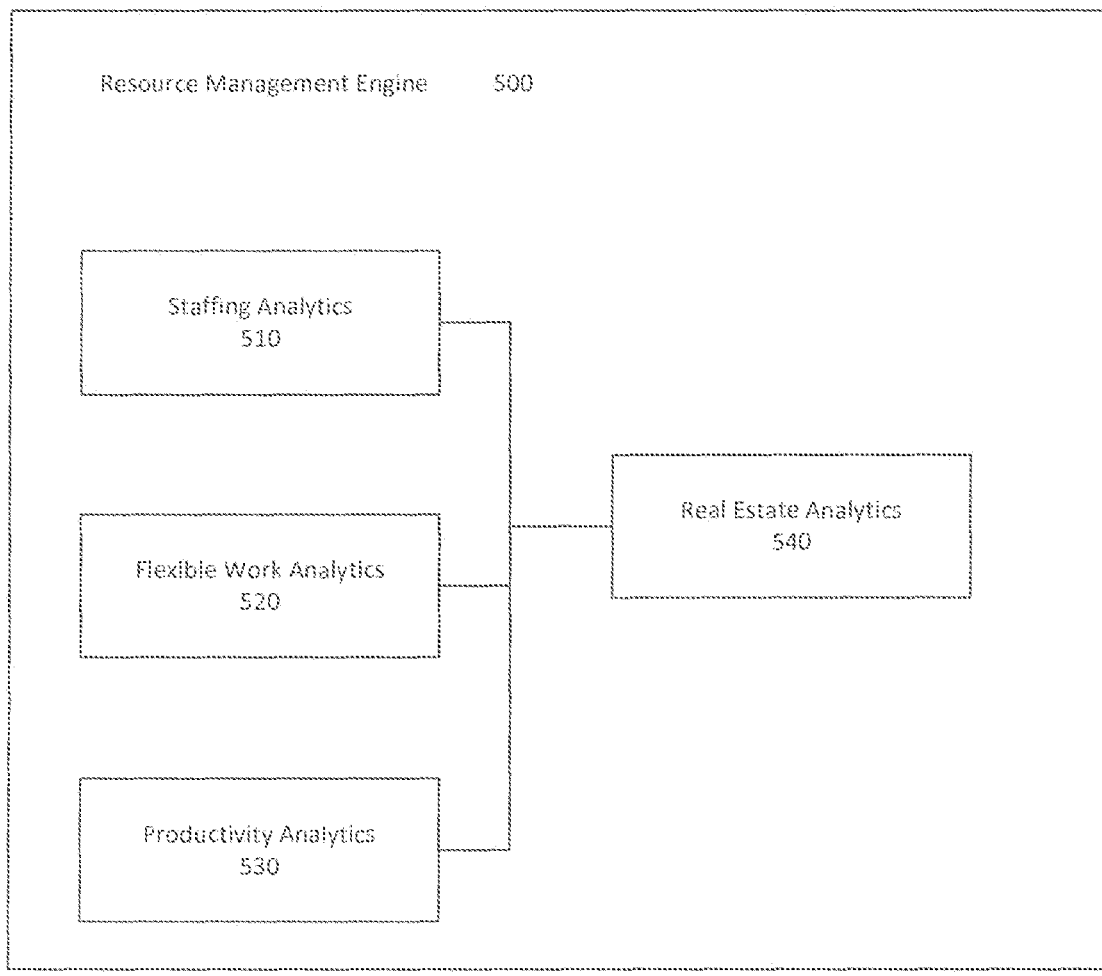
FIG. 5 is a block diagram illustrating a resource management engine of the virtual management system in accordance with an embodiment of the invention.

FIG. 5 is a block diagram illustrating a resource management engine 500 of the virtual management system in accordance with an embodiment of the invention. In embodiments of the invention, the resource management engine 500 is a computing system and the components illustrated are software routines executed by a processor or the computing system. The resource management engine 500 may include staffing analytics 510, flexible work analytics 520, productivity analytics 530, and real estate analytics 540. The staffing analytics 510 may provide information on management of staffing resources to maximize cost savings or achieve other objectives based on processing engine analyses. The flexible work analytics 520 may provide information on how to utilize flexible work arrangements to maximize cost savings and/or building utilization. The productivity analytics 530 may provide target areas for training based on a comparison of the most productive employees with less productive employees. The real estate analytics 540 may provide recommendations to maximize efficiency and cost savings based on actual building occupancy rates. Other components may be included to match the desired analytics.

Figure 6:
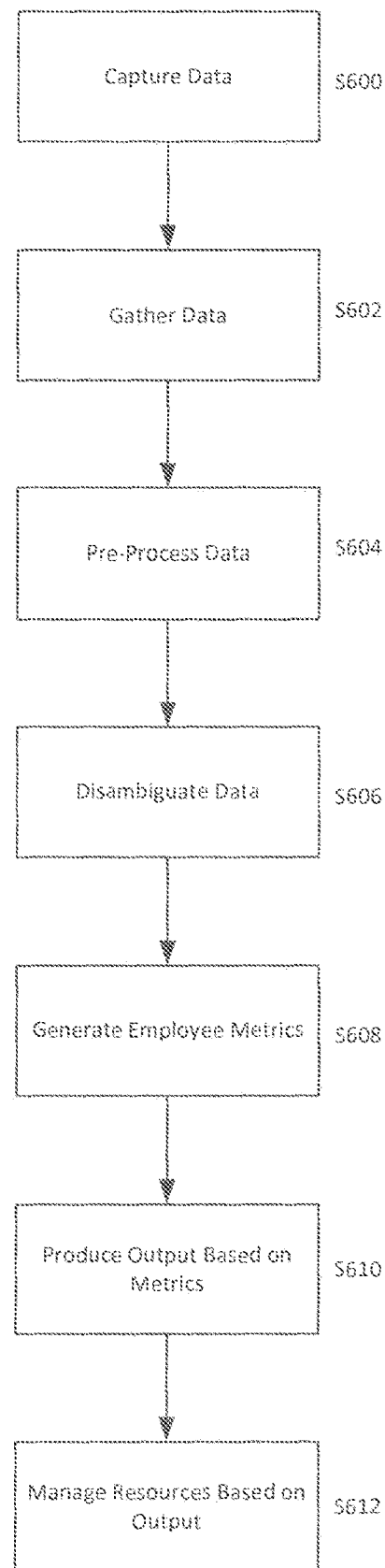
FIG. 6 is a flow chart illustrating a virtual management process in accordance with an embodiment of the invention.

FIG. 6 is a flow chart illustrating a broad overview of a virtual management process in accordance with an embodiment of the invention In S600, employee data is captured at various systems and devices including the corporate data sources and digital devices shown in FIG. 1. In S602, the data is gathered by the data gathering engine of the virtual management computing system. In S604, the virtual management computing system pre-processes the data. Preprocessing may include creation of structured data from unstructured data.

In S606, the processing engine of the virtual management system disambiguates the data used to create employee metrics. One advantage to eliminating data ambiguity is improving the accuracy of employee metrics. As described above, businesses typically do not rely on data gathered from a single data source to generate metrics, because the data typically suffers from multiple ambiguities. For example, businesses are generally reluctant to rely on badge swipe data to calculate employee attendance; badge swipes do not account for employees working remotely, or when employees hold building doors open for each other, or when badge readers are broken. However, by comparing the badge swipe data to other data sources, such as employee desktop log-in and log-out data, or remote access VPN, business may resolve ambiguities and improve the accuracy of employee attendance metrics. In accordance with one aspect of the invention, ambiguity in the gathered data is resolved, i.e., disambiguated, by comparing data across different data sources. For example, if it is unclear from the badge swipe data whether an employee has swiped into work on a particular day, the badge swipe data may be cross-checked with desktop log-in and log-out data, or remote access VPN data to triangulate whether the employee was on site or working remotely.

In accordance with another embodiment of the invention, the accuracy of employee arrival time metrics may be improved by disambiguating the data with other data sources. Arrival time may be calculated at least in part based on records of the dates and times employees log into the company system. However, simply analyzing the average log-in time fails to account for workers who work in shifts and may work multiple shifts throughout a given day. Moreover it fails to account for employees that have complex work schedules, which may involve logging in remotely at four AM to checked email, for example, and then logging in once more at eight AM upon arriving to work after a long commute. Accordingly, the data may be disambiguated through comparison with other data such as data showing an employee's periods of employee inactivity.

In S608, the virtual management computing system generates employee metric based on the disambiguated data. The metrics generated may be or include the metrics illustrated in FIGS. 10A-10*l*) as well as other metrics.

In S610, the processing engine of the virtual management computing system produces output based on the metrics. This output may be through the reporting or visualization system and may include reports and displays included in FIGS. 7-25 below. In embodiments of the invention, the output is responsive to queries entered by an analyst.

In one aspect of the invention, employers may analyze multiple employee metrics for studying trends and relationships in employee data. In one particular aspect, multiple metrics may be analyzed to compare the productivity of different groups of employees. For example, "full day of work" metrics may be compared for salaried and non-salaried employees. Comparing these metrics with salaried and non-salaried billing rates allows employers to make high-level comparison across different employee groups, such as evaluating the difference in active and inactive work patterns and costs between the groups throughout a given day.

In another aspect of the invention, the metrics may be analyzed to compare the productivity of different groups of employees based on location. For example, if two groups of employees perform similar functions in two separate locations, the employee metrics may be analyzed to evaluate the differences in productivity based on location.

Employers may beneficially use location and cost data for analyzing other employee metrics. For example, employers may compare employee activity and productivity in combination with location costs and resource costs. Employee metrics further allow employers to analyze what resources are assigned to a particular location, and determine whether to add or remove capacity to a given location, or relocate resources. In embodiments of the invention, the resource management engine can perform an Optimization routine to provide employers with a recommendation, as will be further described below.

In another aspect of the invention, employers may use the employee metrics as a behavior based early warning system. Employers can analyze historical records of behavior-based employee metrics to extrapolate cyclical trends in employee behavior. With these trends, employers are enabled to detect variations in employee behavior to warn the employer of potential productivity risks.

In another aspect of the invention, employer may use the employee metrics to create synthetic benchmarks of employees. By aggregating the employee metrics of multiple employees, employers may determine a metric benchmark representative of the group of employees. This enables employers to accurately compare productivity and activity metrics to a representative benchmark.

In S612, the virtual management computing system manages resources based on the produced output. The resource management engine operates responsive to queries to provide simulated reconfiguration of resources based on the calculated metrics. Simulated redistribution of resources could include, for example: building usage proposals based on real estate metrics; staffing proposals based on employee efficiency data; and flexible work arrangements to reduce costs based on calculated attendance metrics. These are merely examples, as the system may use the calculated metrics to make any proposals or simulations based on the metrics. The order of the displayed steps may also be altered in any convenient manner. Additionally, multiple steps may occur simultaneously. For example, resource management and visualization may occur simultaneously after computation of metrics.

Thus, according to the method discussed above, a computer storage system may receive unstructured, semi-structured and structured data from raw data sources. The data is received by a data reservoir. In accordance with one embodiment of the invention, the data reservoir may be a Hadoop® distributed file data management system executing ETL procedures. The raw data is consolidated at the reservoir, and then communicated to an MPP engine, where employee metrics are generated. The MPP engine may receive the consolidated data from the reservoir by executing ETL procedures. The data is then communicated from the MPP engine to a data visualization user interface and a reporting engine. The data may also be communicated to the resource management engine prior to or simultaneously with the visualization.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or iOS operating systems, Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system of platform. In other embodiments, the operating system may be or include operating systems specifically adapted for mobile devices, such as the Google Android™ mobile operating system, the Mozilla Firefox™ OS mobile operating system, the RIM BlackBerry™ mobile operating system, the Apple iOS™ mobile operating system. Nokia Symbian™ or S40™ (Series 40) mobile operating systems, Microsoft's Windows Phone™, Windows 8™, or Windows RT™ operating system, the Samsung Bada™ mobile operating system, the Hewlett Packard webOS™ mobile operating system, the Palm OS™ mobile operating system, the Maemo™ mobile operating system, or the MeeGo™ mobile operating system.

At a minimum, the memory includes at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer systems described above may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, Objective C, C++, COBOL, dBase, Forth, FORTRAN. Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed microprocessor, microcontroller, peripheral integrated circuit element, a CSIC (Visitor Specific Integrated Circuit). ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, capacitive and resistive (multi-touch) touch screens, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interlace or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet. Extranet, Ethernet, or any other system that provides communications. Some suitable communications protocols may include TCP/IP. UDP, or OSI, for example. For wireless communications, communications protocols may include Bluetooth, Zigbee. IrDa or other suitable protocol.

Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 7:
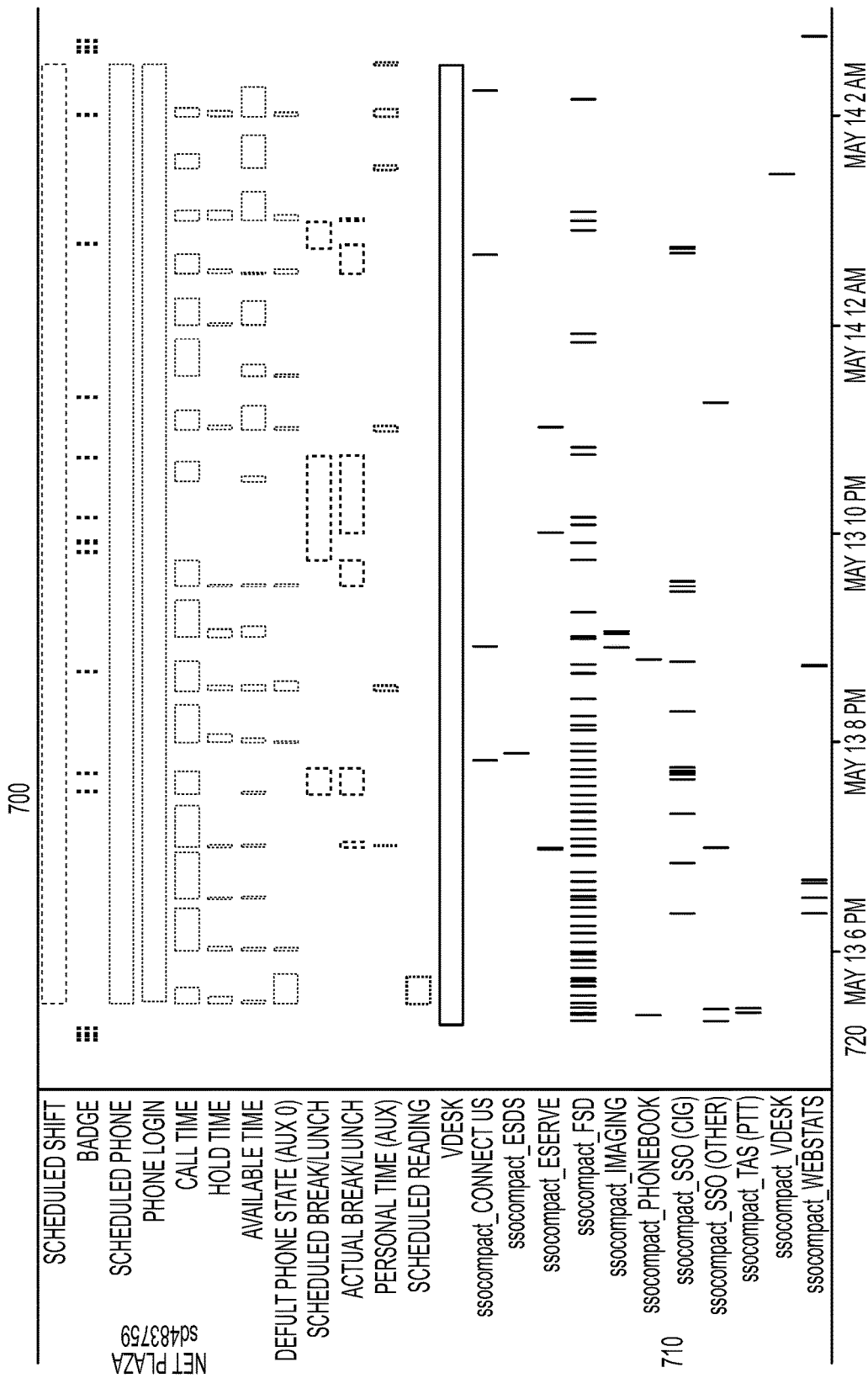
FIG. 7 is a user interface illustrating a daily activity summary generated by the virtual management system in accordance with embodiments of the invention.
Figure 8:
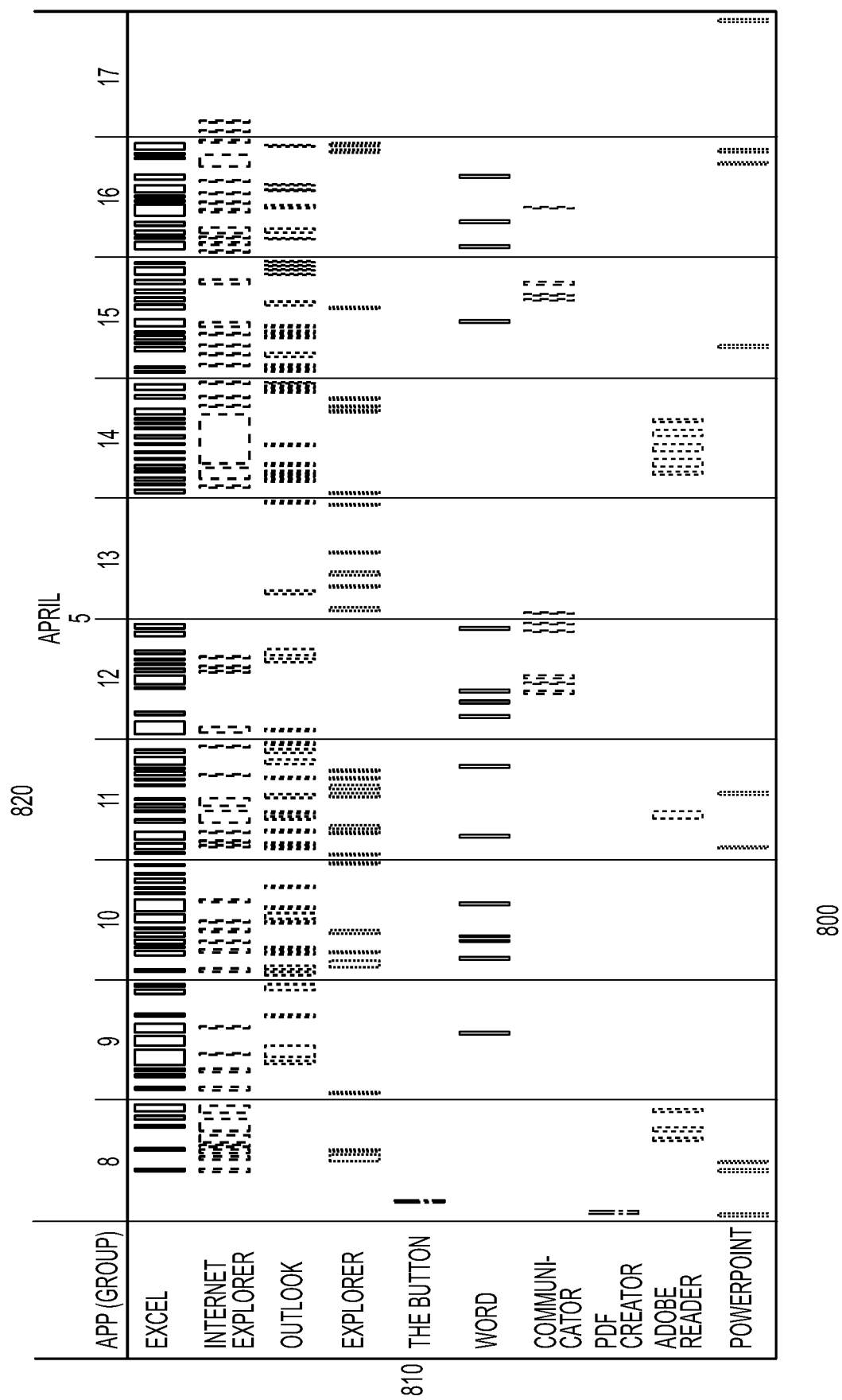
FIG. 8 is a user interface illustrating an application usage summary generated by the virtual management system in accordance with an embodiment of the invention.

FIGS. 7-9 illustrate user interfaces produced by the visualization engine utilizing metrics calculated by the processing engine. FIG. 7 is a user interface 700 illustrating a daily activity summary generated by the virtual management system in accordance with embodiments of the invention. Along the y-axis 710, all of the tasks and actions performed by the employee are listed. These tasks and actions are illustrated over time on the x-axis 720. The top bar on the graph illustrates an employee's scheduled shift, which spans across much of the time shown on the x-axis. The second set of bars below the scheduled shift is representative of badge swipes in instances in which a badge is detected to allow an employee entry to a work area or floor of a building. The next bar illustrates scheduled phone time, which in the current example, spans the entirety of the employee's scheduled shift. Similarly, the following bar represents phone log-in and illustrates that the employee was logged into the phone system for the entire scheduled time. The set of bars below this represents actual call time, which is dispersed intermittently throughout the scheduled shift. Other parameters displayed on the bar graph include hold time, available time, default phone state, scheduled breaks, actual breaks, personal time, and scheduled reading. The bar graphs additionally display time spent accessing various systems available within the organization. Thus, FIG. 7 serves to show disambiguation of employee attendance based on multiple data sources.

FIG. 8 is a user interface illustrating an application usage summary 800 generated by the virtual management system in accordance with an embodiment of the invention. The illustrated usage summary includes applications along the y-axis and dates along the x-axis. Thus, the usage summary may illustrate the frequency with which an employee accesses specific applications each day. The applications may include applications available on the employee's computer, such as Microsoft Excel®, Internet Explorer®, Outlook®, The Button®, Microsoft Word®, Communicator®, PDF Creator®, Adobe Reader®, and Powerpoint®.

FIGS. 9A-9C illustrate embodiments of a skills matrix generated by the virtual management system. Through automated review of detailed historical work activity, the virtual management computing system is able to generate a comprehensive skills matrix. As illustrated, the skills matrix can be segmented across multiple parameters to identify skill capabilities across the work force. The virtual management computing system, either interactively or automatically, can be utilized to identify the most qualified employees for each task based on factors such as speed, highest success rate, accuracy rate, etc. For example, in response to an analyst query, the resource management engine may recommend a set of employees based on skills, location, and availability, to perform a particular task. FIG. 9A illustrates a skills matrix for employees by SID 910 that includes a plurality of skills 920, such as Oracle, Database, and SQL on various systems 926. The matrix may also list resolution code 930, incident volume 940. PISX volume 950. Manager 960, Country 970. City 976, Worker type 980, and vendor 990.

FIG. 9B is a graph 902 illustrating a skill (Sybase™) by location by including SID on the y-axis 906 and location on the x-axis 904. If an employee shown on the graph possesses the skill in question, a dot appears in the city column for that employee. Similarly, FIG. 9C is a graph 912 illustrating database/file system repair skills for employees 914 by location 916.

FIGS. 10A-10D illustrate an embodiment of a virtual manager metrics library in accordance with an embodiment of the invention. In all of FIGS. 10A-10D, various data sources including desktop login systems, badge swipes (BS), and digital profile (DF) are utilized to define metrics relevant to employee activity. In FIG. 10A, an attendance/arrival time catalog 1000 is provided. Various Metrics 1010 are described at 1012 and calculated at 1014. The metrics may include DF start of day, DF hours/day, DF hours/week, DF attendance onsite, DF attendance remote, DF attendance, DF attendance/no activity, and primary building.

The DF start of day may be determined either based on a first badge swipe or based on VPN plus desktop login/logout data if the employee is working remotely. Thus, the calculation may take the form of BS+desktop logins or VPN+ desktop logins.

The DF hours/day may be defined as an employee digital average workday length beginning with arrival time and segmented into active and inactive periods. Thus, a calculation for DF hours/day may be formulated as DF start of day+desktop login active time-desktop login inactive time.

The DF hours/week may be defined as employee digital average workday length over a work week. The DF hours/ week may be calculated as the sum of DF hours/day from Monday at 0:00 to Sunday at 23:59. Of course, the beginning and ending times for calculations may be adjusted for convenience.

The DF attendance onsite is defined as employee onsite activity on a given day. The DF attendance onsite can be calculated by summing VPN and desktop login time.

The DF attendance remote refers to employee remote activity on a given day. The time consumed by remote activity can be calculated by summing VPN and desktop login time.

The DF attendance is a state in which the employee is actively working, either remotely or onsite. Therefore, the OF attendance is defined by either DF attendance onsite or DF attendance remote.

The DF attendance—No activity metric is a state that occurs when an employee has no digital activity for a given day. Primary Building is a metric defining a building location with the highest number of badge swipes per employee on a given day. If multiple buildings have the same number of badge swipes, then the building with the first badge swipe will be defined as the primary building.

FIG. 10B includes an activity analysis 1020 showing metrics 1010 related to employee activities as well as descriptions 1012 and calculations 1014. The metrics may include email activity, first badge swipe, first Windows® login, Windows® login/unlock and Windows® logout/lockout. Email activity may be defined as the total count of employee internal and external email activity on a given day. The email activity metric may be calculated by summing internal emails sent and external emails sent. The first badge swipe metric may be defined and calculated as the first badge swipe timestamp after 3 AM on a given day. Of course the time may be adjusted for the purpose of definition to any convenient time. The first Windows® login may be similarly defined as the first Windows® login after 3 AM and may be ascertained by the timestamp of the first desktop login after 3 AM. The metrics related to Windows® login and logout may be determined by a count of desktop login and logout activity respectively on a given day.

FIG. 10C is a table 1030 illustrating workday lengths. Metrics 1010 are shown in the first column. Descriptions 1012 are shown in the second column and calculations 1014 corresponding to the metrics are shown in the third column. The metrics of DF Hours/Day and DF Hours/week may be stored and defined in the same manner as described above with respect to FIG. 10A. The workday length table 1030 may additionally include self-reported hours/week, self-reported overtime hours, over-reported hours, under-reported hours, and overtime costs. Self-reported hours/week and self-reported overtime hours refer to self-reported employee hours. Over-reported hours are defined as total self-reported employee hours in excess of employee DF hours and under-reported hours are defined as total employee DF hours in excess of self-reported employee hours. The Overtime Cost metric is defined as the dollar amount of employee self-reported overtime hours and may be calculated based on the sum of the straight payment amount and the overtime payment amount.

FIG. 10D illustrates a location metric table 1040. The location metric table 1040 lists the various metrics 1010 in a first column, a description in the second column, and a calculation in the third column. The metrics related to location may include DF attendance onsite, DF Attendance Remote, DF Attendance, DF Attendance—No Activity, Primary Building, and Attendance Max. Most of these metrics are defined above with respect to FIG. 10A. The Attendance Max metric refers to the greatest number of employees in attendance at a location for a given day over a given time period.

Figure 11A:
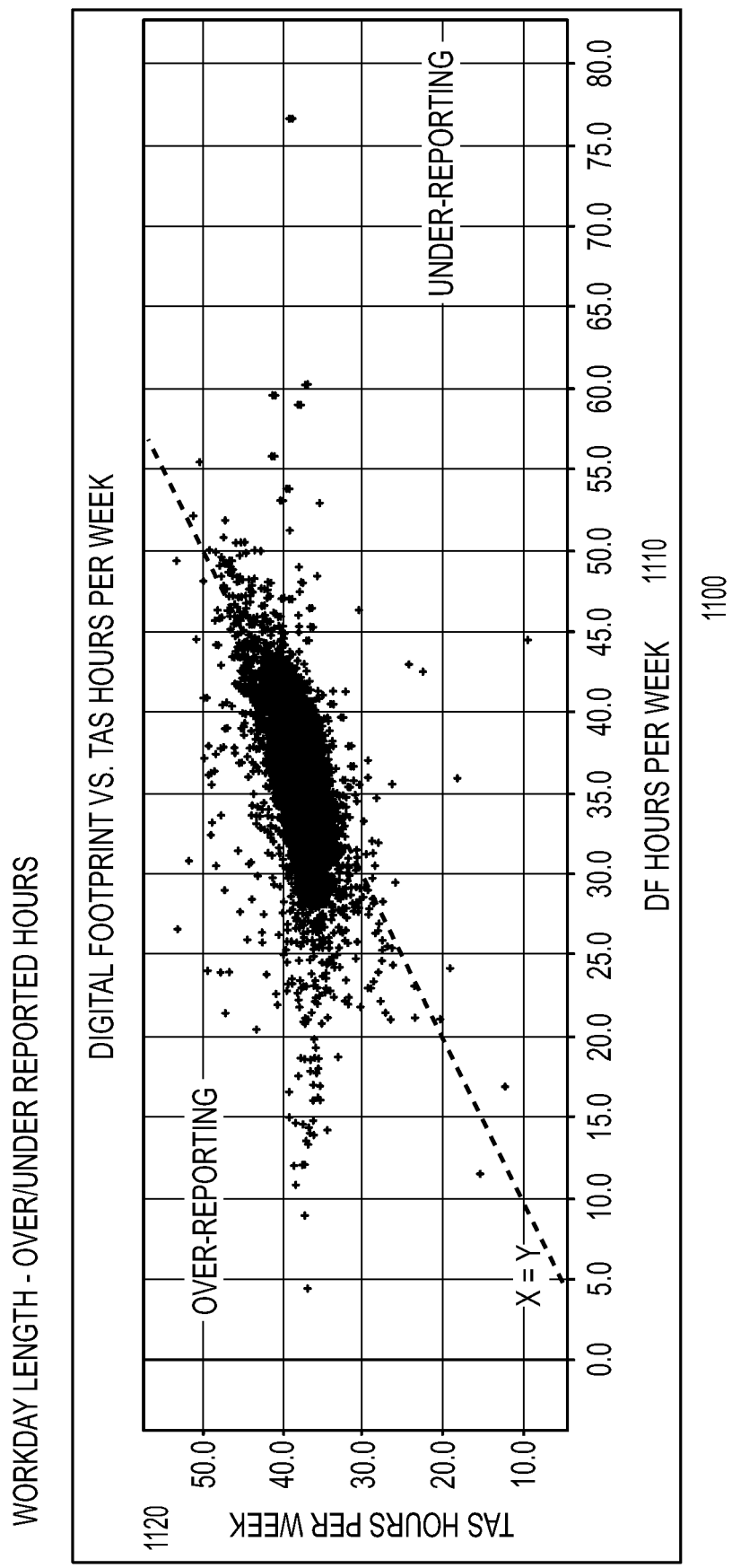
FIGS. 11A and 11B are graphical displays enabling employee hours analysis in accordance with an embodiment of the invention.
Figure 11B:
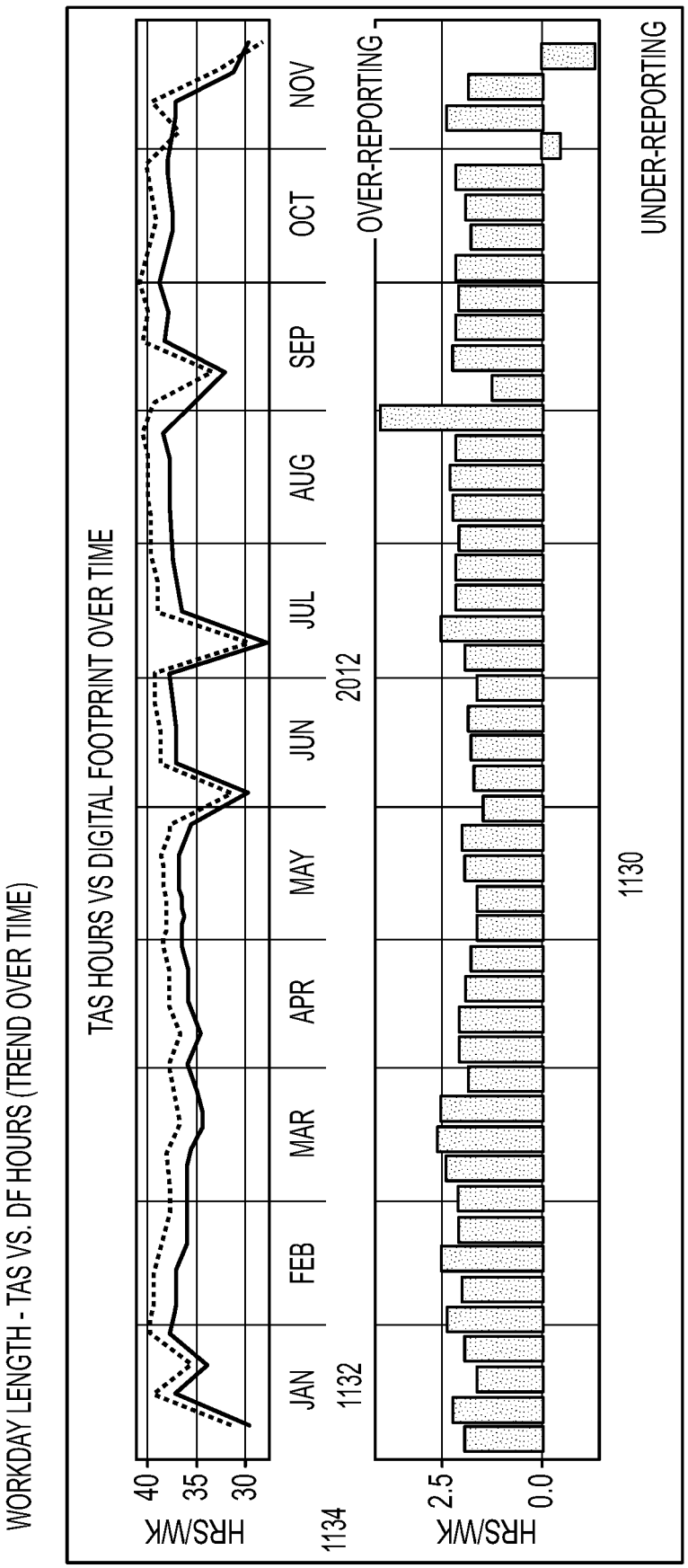

FIGS. 11A and 11B are graphical displays enabling employee hours analysis in accordance with an embodiment of the invention. FIG. 11A is a scatter plot 1100 illustrating over-reporting and under-reporting of hours. DF hours per week 1110 are shown on the x-axis and self-reported hours per week 1120 are shown on the y-axis. A straight line representing x=y shows the division between over-reporting of hours above the line and under-reporting of hours below the line. In the scatter plot, each point represents an individual employee's self-reported hours plotted against DF hours.

From a resource management standpoint, a business analyst using the virtual management system of the invention may query the system to determine what proportion of the workforce is mis-reporting hours by more than ten hours per week. The analyst may also query the system to determine if savings can be captured by changing the staffing mode. In order to generate the scatter plot illustrated, the virtual management system may receive various inputs discussed above from sources including SSO, worker information systems (WIS) for one or more line of business. VPN, an enterprise security management system, a desktop login/logout system, self-reporting systems, Internal Mail, and External email. Based on data gathered from these sources, the virtual management system computes metrics described above, which for generating the scatter plot, include DF hours/week and self-reported hours/week. The virtual management system may be operative to impose various filters to specifically focus on a particular set of employees in a particular location or for a particular time period. For example, filters may include country, campus, building, hierarchy, job family, job role, worker type, and other filters.

FIG. 11B illustrates graphs 1130 showing trends over time for over-reporting and under-reporting. The graphs represent an aggregate time series view of self-reported hours against DF hours over a given time period. The over-reporting graph is a line graph and the under-reporting graph is a bar graph. On both graphs, the x-axis 1132 represents month and the y-axis 1134 represents hours per week. In operation, a business analyst may query the virtual management system to determine whether employees mis-reported hours consistently over a particular time period. The business analyst may also ask the system to determine if savings can be captured by changing the staffing model to address the periods with the greatest concentration of mis-reported hours. In order to generate the illustrated representations, the system may collect data from sources including SSO. WIS (LOB), VPN, an enterprise security management system, a desktop login/logout system, self-reporting hours systems, Internal Email and External Email. Based on the input data, the virtual management computing system calculates metrics including DF hours/Week, self-reported Hours/Week. Over-reported Hours, and Under-Reported Hours. Population filters may be applied to focus on a particular group of employees. For example, the data may be filtered by country, campus, building, hierarch, job family, job role, worker type, or individual. In embodiments of the invention, the data may be filtered to include only employees with self-reported hours data and seven or more DF hours per day.

FIGS. 12A-12D are graphical displays related to mis-reporting of hours generated by the virtual management computing system in accordance with embodiments of the invention. With respect to FIG. 12A, a histogram 1200 provides an indication of average potential over-reported hours. The y-axis illustrates number of employees and the x-axis shows average hours per week. The bars illustrated average over-reported hours per week per employee, based on a comparison between self-reported and DF hours. The legend includes calculation of mean and median over-reported hours. The data visualization is averaged per employee, per week, over a given time period. To obtain the visualization, a business analyst utilizing the virtual manager computing system may submit a query to determine what proportion of the workforce is over-reporting by more than ten hours per week. As set forth above, the query may require filtration based on a number of population filters in order to more narrowly focus on a group of employees.

Figure 12A:
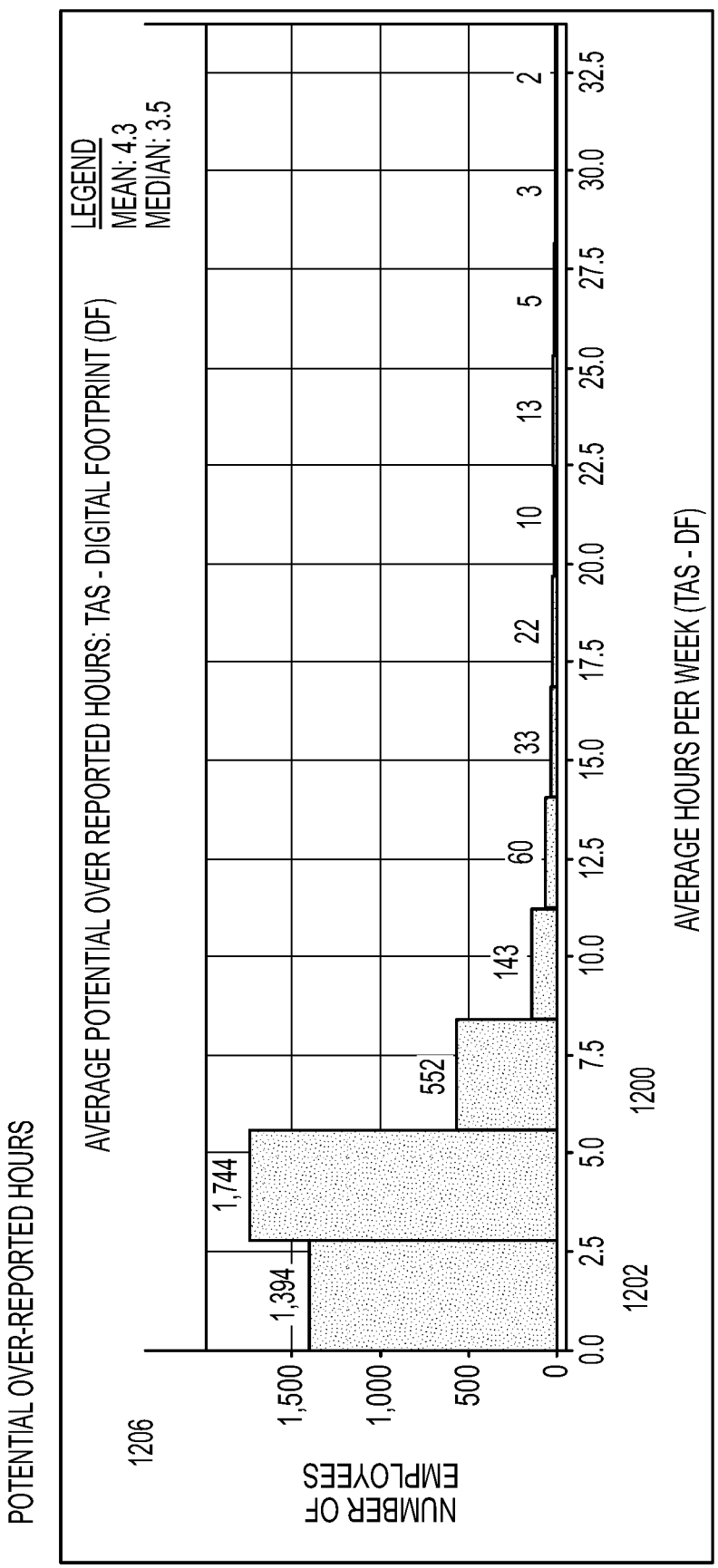
FIGS. 12A-12D are graphical displays related to misreporting of hours generated by the virtual management computing system in accordance with embodiments of the invention.
Figure 12B:
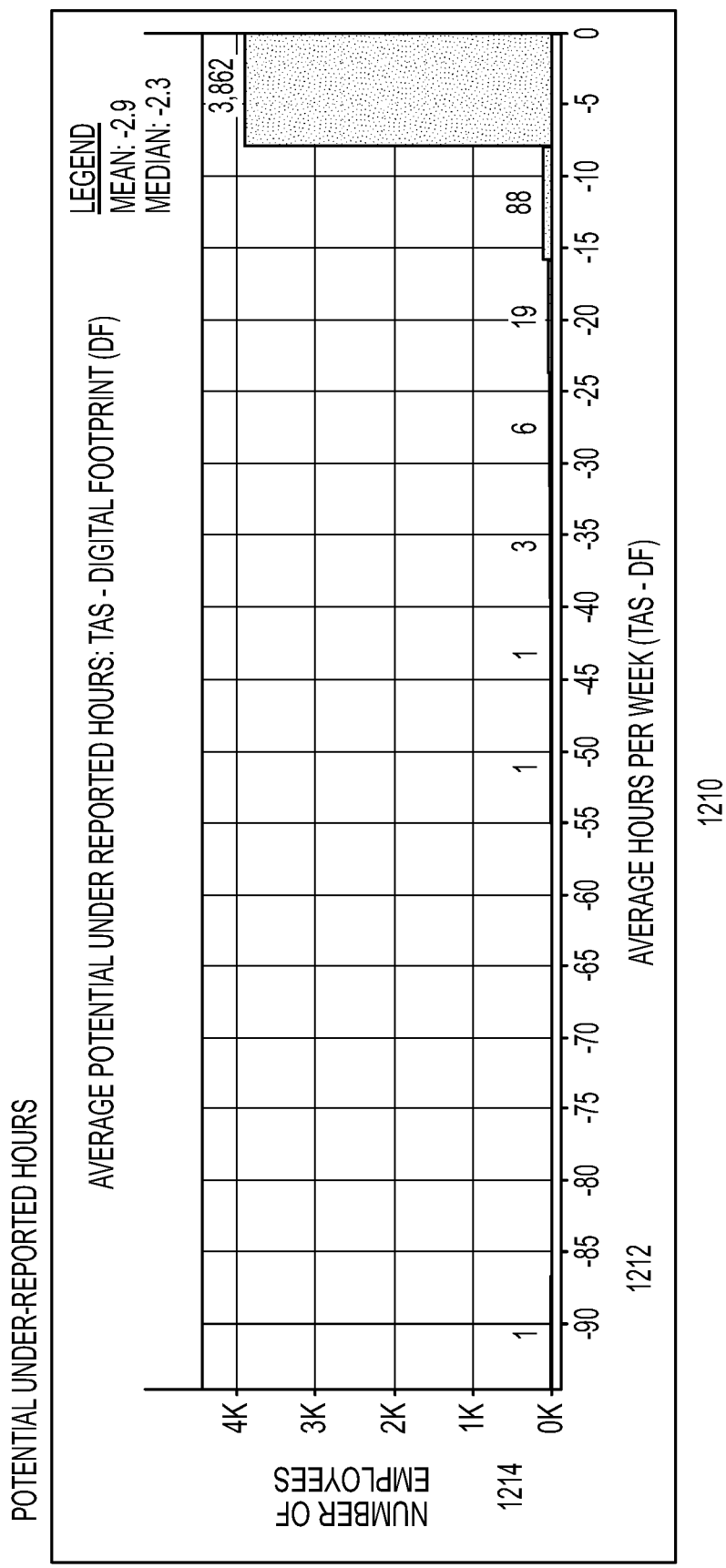

FIG. 12B includes a graph 1210 showing average potential under reported hours. The x-axis 1212 shows average hours per week and the y-axis 1214 shows number of employees. The visualization includes a count of employees per average under-reporting hours segment. The legend indicates mean and median under-reported hours. The hours are averaged per employee, per week over a given time period. Such a visualization may be generated by the virtual management computing system in a response to a query asking what proportion of the workforce is under-reporting by more than ten hours per week. The visualization can be used to assist in a manual determination of whether savings can be captured by changing the stalling model. Alternatively, the metrics calculated, including DF Hours/Week, self-reported Hours/Week, and Under-Reported hours can be fed into the resource management engine for automatic determination of savings that may be captured. As set forth above, various filters may be used to focus on particular groups of employees.

Figure 12C:
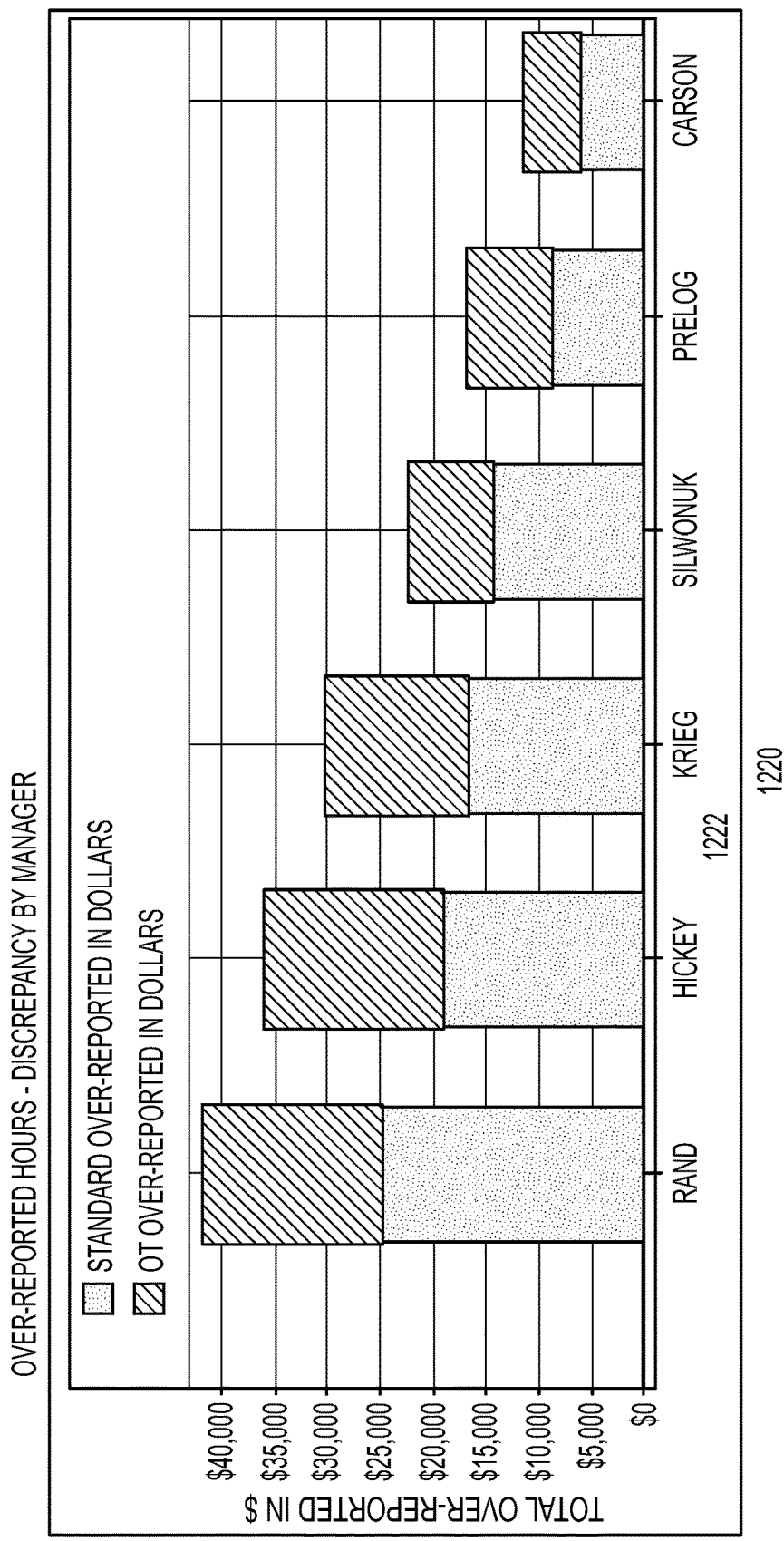

FIG. 12C is a bar graph 1220 illustrating over reported hours by manager. An x-axis 1222 lists the managers and the y-axis 1224 lists the total over-reported in dollars. Each bar of the graph represents aggregate potential dollar costs of over-reporting for the employee population over a given time period. Each bar is segmented into standard and overtime hours. The virtual management computing system may produce the illustrated bar graph when a user submits a query asking for an illustration of potential dollars associated with over-reporting of hours. Based on data captured from the sources above, the virtual management computing system calculates metrics including Over-Reported Hours, self-reported Overtime Hours, and Overtime Costs. Furthermore, the user may request population filters as described above.

Figure 12D:
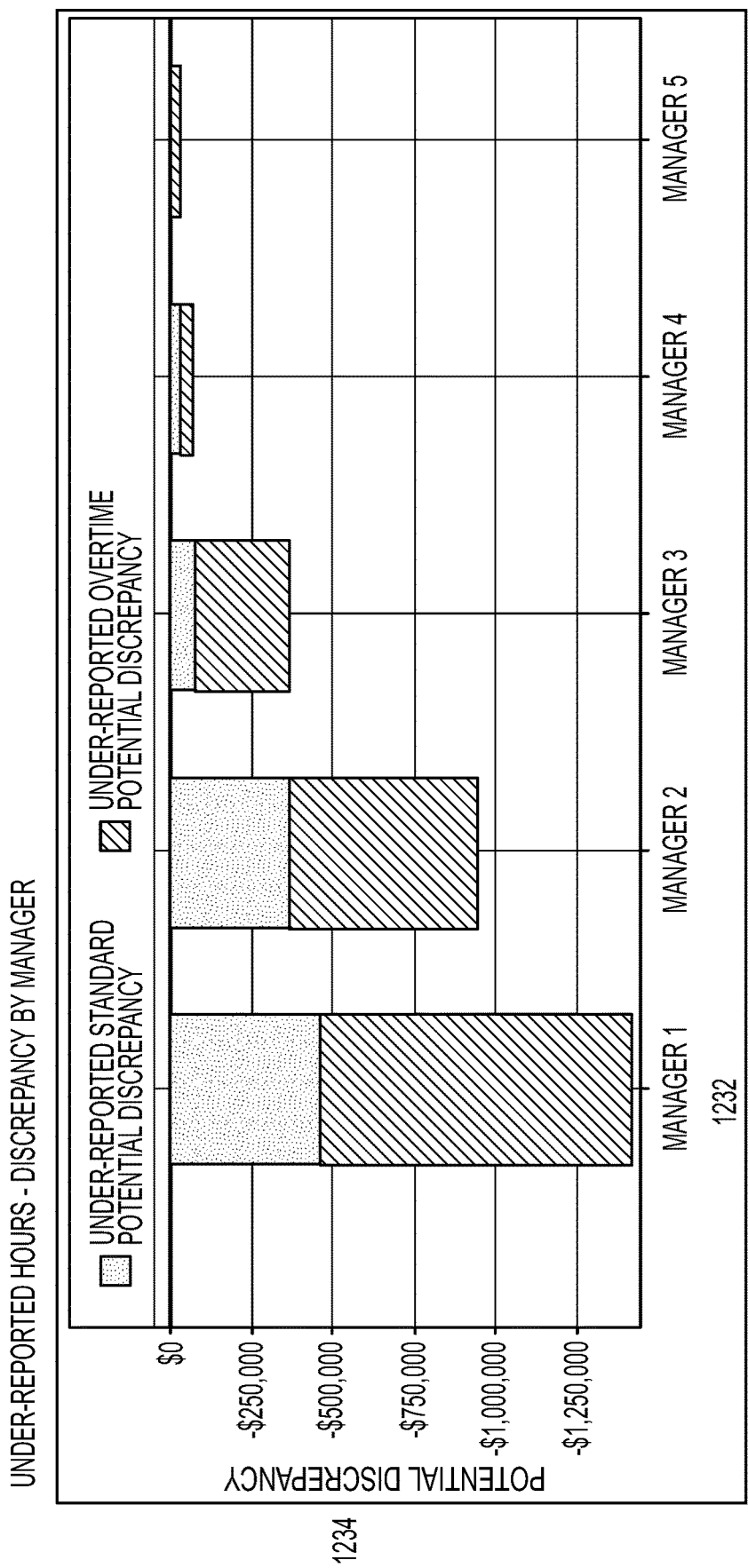

FIG. 12D is a bar graph 1230 illustrating total under-reported hours and associated dollar costs of the employee population segmented into standard and overtime hours per manager. Managers are listed along the x-axis 1232 and the potential dollar discrepancy is listed along the y-axis 1234. Each bar represents aggregate potential dollar costs of under-reporting for employee population over a given time period and each bar is segmented into standard and overtime hours. Thus, a user may enter a query into the virtual management system searching for the potential dollars associated with under-reporting of hours and the virtual management system may generate the bar graph 1230. In operation, the virtual management computing system may receive data from the sources listed above and may calculate metrics including Under-Reported Hours, Overtime Hours, and Overtime Cost. As set forth above, population filters may be selected to focus on a portion of the employee population.

Figure 13A:
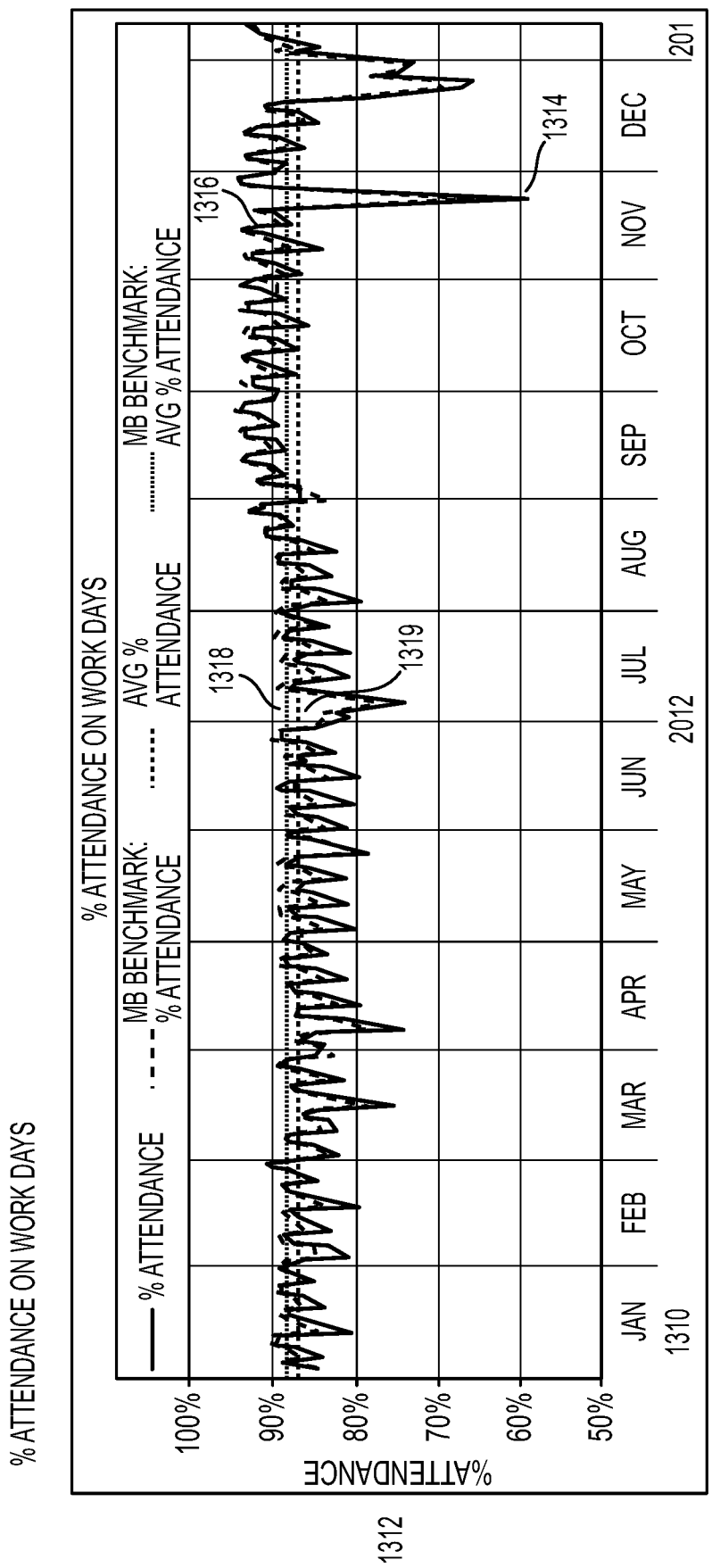
FIGS. 13A-13C are graphical displays of attendance metrics generated by the virtual management system in accordance with embodiments of the invention.
Figure 13B:
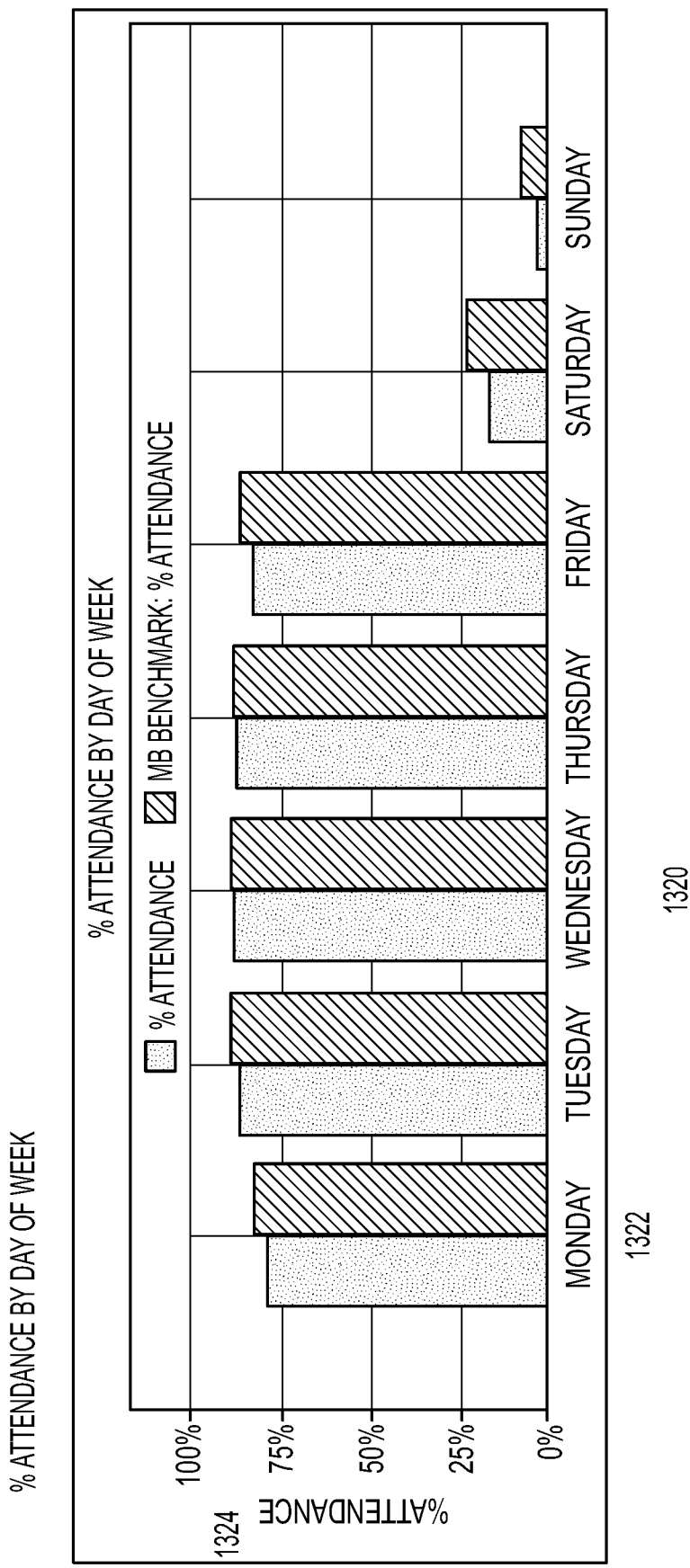
Figure 13C:
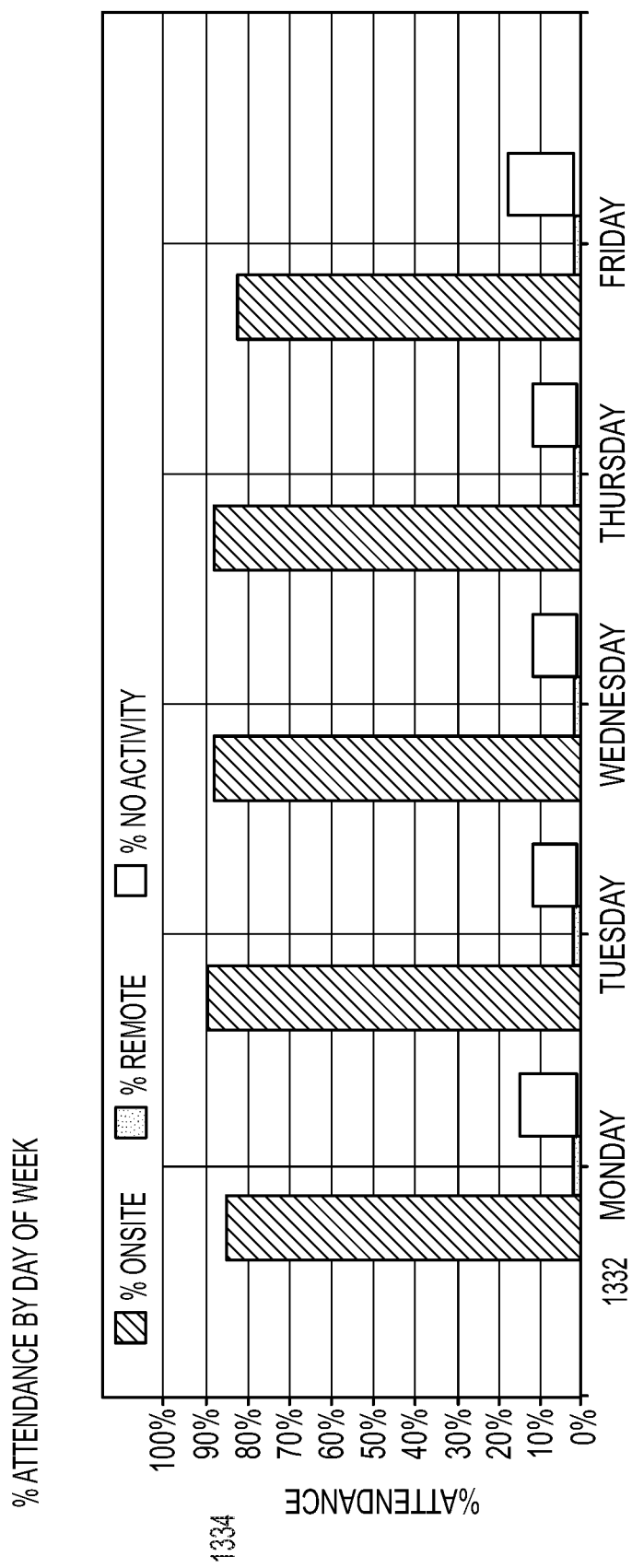

FIGS. 13A-13C are graphical displays of attendance metrics generated by the virtual management system in accordance with embodiments of the invention. FIG. 13A is a line graph 1300 illustrating percentage of attendance on work days. An additional line is presented representing an average benchmark of the population. The x-axis 1310 measures time in months and the y-axis 1312 measure the percentage attendance. Line 1314 shows percentage attendance and line 1318 shows average percentage attendance. Lines 1316 and 1319 shown the respective corresponding benchmarks. A business analyst may query the virtual management computing system to determine how the overall attendance of individuals compares to a benchmark population attendance rate in order to determine if savings can be captured through a reduced staffing model or flexible work arrangements. Thus the virtual management computing system collects data from various sources including SSO, a desktop login/logout system, WIS (LOB), VPN, and enterprise security management systems to calculate the DF attendance metric. As set forth above, population filters may be applied to focus on specific portions of the population.

FIG. 13B is a bar graph 1320 illustrating percentage attendance by day of week. X-axis 1322 illustrates days of the week and y-axis 1324 illustrates percentage attendance. The bar graph illustrates the percentage of employees with activity across an enterprise security management system. VPN, a desktop login/logout system, or SSO. The shaded bars represent the percentage attendance and the striped bars represent the benchmark population. The metrics are averaged per day of the week over the defined time period. Thus, the virtual management computing system gathers data from sources identified above with respect to FIG. 13A and calculates the DF attendance metric. The produced graph may be responsive to a query from an analyst regarding how the daily attendance rate of individuals compares to a benchmark population attendance rate. The analysis produced may be helpful to the analyst or the virtual management system to determine if savings can be captured through a reduced staffing model or flexible work arrangements. As set forth above, the population may be narrowed using population filters as set forth above.

FIG. 13C is an additional bar graph 1330 illustrating percentage attendance by day of week, but also takes into account the percentage of employees working remotely and the percentage of employees with no activity. Days of the week are listed along x-axis 1332 and percentage attendance is listed along y-axis 1334. The bar graph 1330 illustrates three different measures including the percentage of remote employees with activity across VPN, SSO or smart button, the percentage of onsite employees with activity across an enterprise security management system, SSO or a desktop login/logout system, and the percentage of employees with no activity. Based on input from the data sources specified above with respect to FIGS. 13A and 13B, the virtual management computing system calculates metrics including DF attendance, DF Attendance-Remote, DF Attendance-Onsite, and DF-No Activity to produce the bar graph. The graph of FIG. 13C may be produced responsive to a query from a business analyst asking what percentage of employees work remotely versus onsite on work days and can be useful in determining whether savings can be captured through flexible work arrangements. As set forth above, population filters may be applied to narrow the employee population under consideration.

Figure 14B:
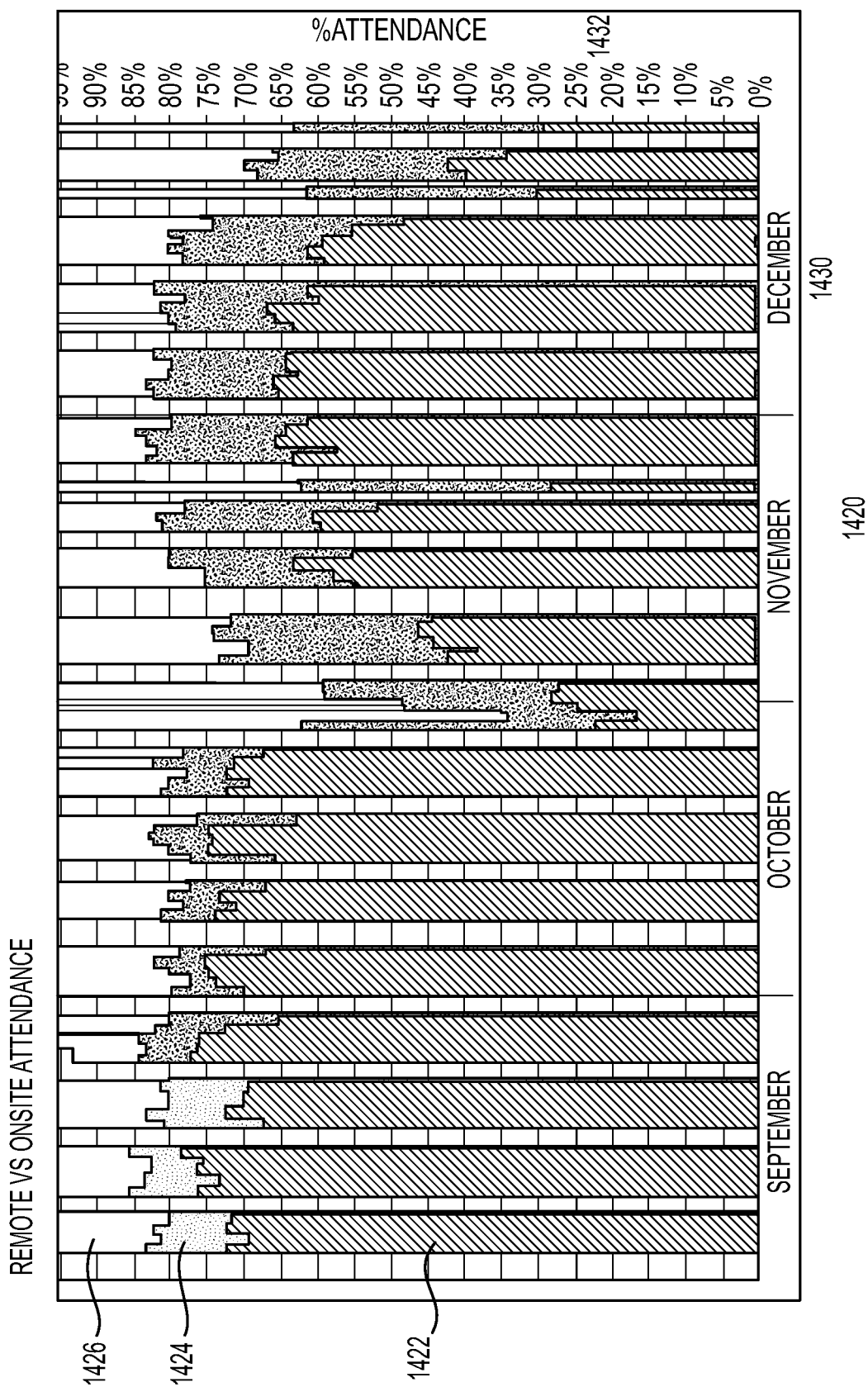

FIGS. 14A and 14B are charts illustrating remote vs. onsite attendance created by the virtual management system in accordance with embodiments of the invention. FIG. 14A illustrates a table 1400 showing the percentage of employees with remote, onsite, and no activity on given weekdays. Column 1402 shows the dates. Column 1404 illustrates percentage and count for onsite attendance. Percentage and employee count for remote attendance are illustrated in column 1406 and percentage and employee count for no activity are listed in column 1408. The total employee count is listed in column 1410. The virtual management computing system may produce the table 1400 in response to an analyst query asking what percentage of employees work remotely versus onsite on work days. The metrics calculated and table 1400 may be useful in determining whether savings can be captured through flexible work arrangements. Thus, the virtual management system collects data from the sources identified in FIG. 13A and computes metrics including DF Attendance. DF Attendance-Remote, DF Attendance-Onsite, and DF-No Activity to produce the illustrated table.

FIG. 14B is a stacked bar graph 1420 illustrating remote vs. onsite attendance. Months are listed along x-axis 1430 and percentage attendance is measured along y axis 1432. Each bar has a segment showing onsite 1422, remote 1424, and no activity 1426. FIG. 14B is essentially a different representation that answers the same questions and provides a similar analysis to that discussed above with reference to FIG. 14A.

FIG. 15 is a chart 1500 illustrating employee arrival metrics created by the virtual management computing system in accordance with embodiments of the invention. A business analyst may query the system to determine what time employees arrive to work and what portion of employees arrive before 10 AM. In response the virtual management computing system accesses data sources including WIS and an enterprise security management system to derive metrics including Primary Building and Fist Badge Swipe. The chart 1500 includes a column 1502 for office names. 1512 for office size. 1514 for arrival time, 1518 for number of employees arriving after 8 AM, 1520 for percentage of employees arriving after 8 AM, 1522 for number of employees arriving after 9 AM. 1526 for percentage of employees arriving after 9 AM. 1530 for number of employees arriving after 10 AM, and 1536 for percentage of employees arriving after 10 AM. Thus, the chart shows employee average arrival times as well the population percentage arriving after specified times. Population filters may be employed and employees who do not arrive to work may be excluded from the table.

Figure 16:
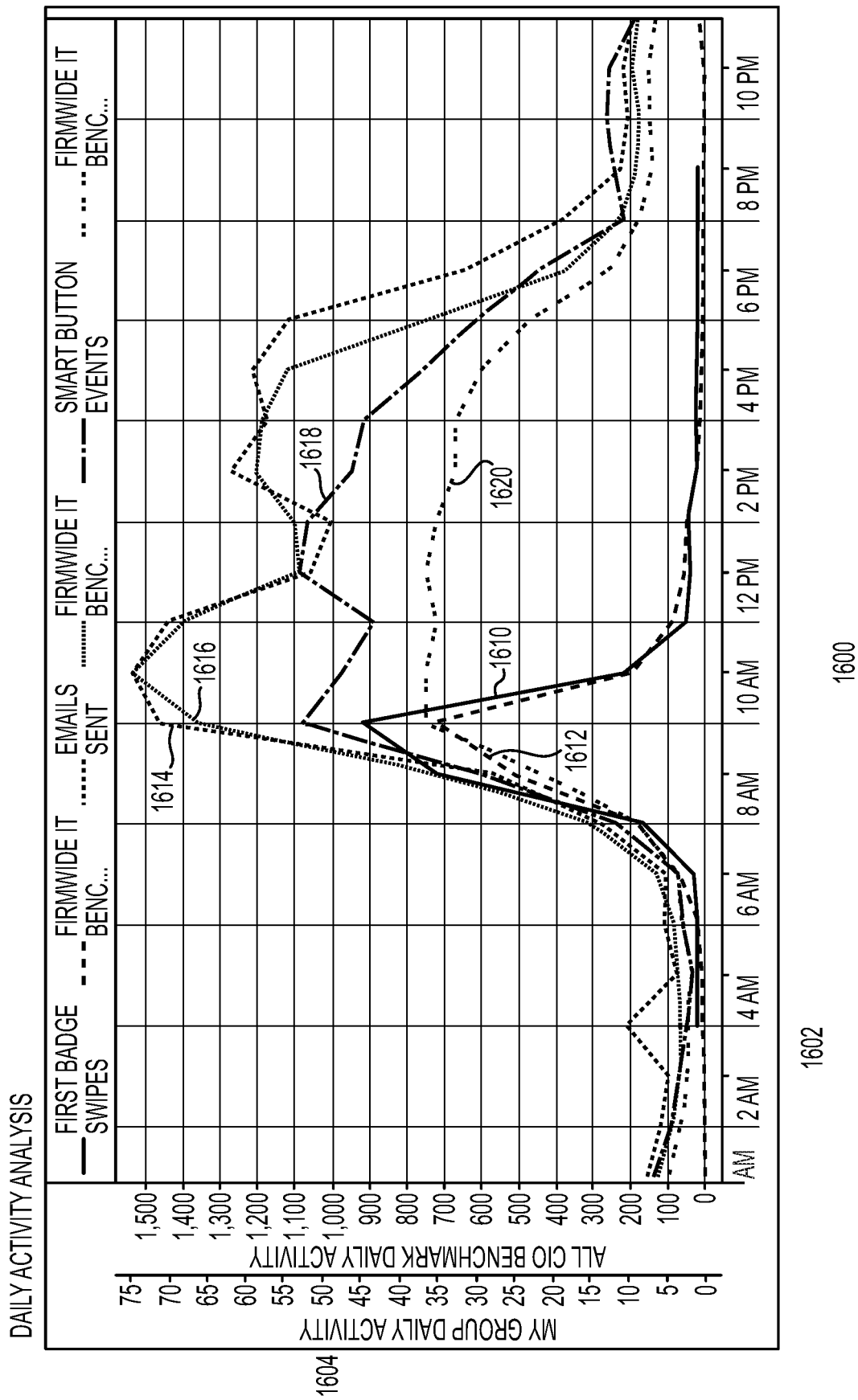
FIG. 16 is a graph illustrating a daily activity analysis generated by the virtual management system in accordance with an embodiment of the invention.

FIG. 16 is a line graph 1600 illustrating a daily activity analysis generated by the virtual management computing system in accordance with an embodiment of the invention. The line graph may be produced in response to an analyst query to determine, for a typical work day, when employees arrive, when they depart, and when they generate the most activity. Times are listed along x-axis 1602 and activity is measured along y-axis 1604. The graph may illustrate a count of employee initial badge swipes with a first line 1610, desktop login/logout events with a second line 1614, and total email activity on an average day with a third line 1618. Accompanying benchmarks may be shown at 1612, 1616, and 1620. The virtual management computing system may gather data from sources including an enterprise security management system. WIS, (LOB, Assigned Building), External email, Internal Email, and desktop login/logout. Based on the data collected, the system may compute metrics including first badge swipe and email activity. Population filters may be applied to limit the population of employees from which data is analyzed. However, generally, computations will be based on the daily active population.

Figure 17:
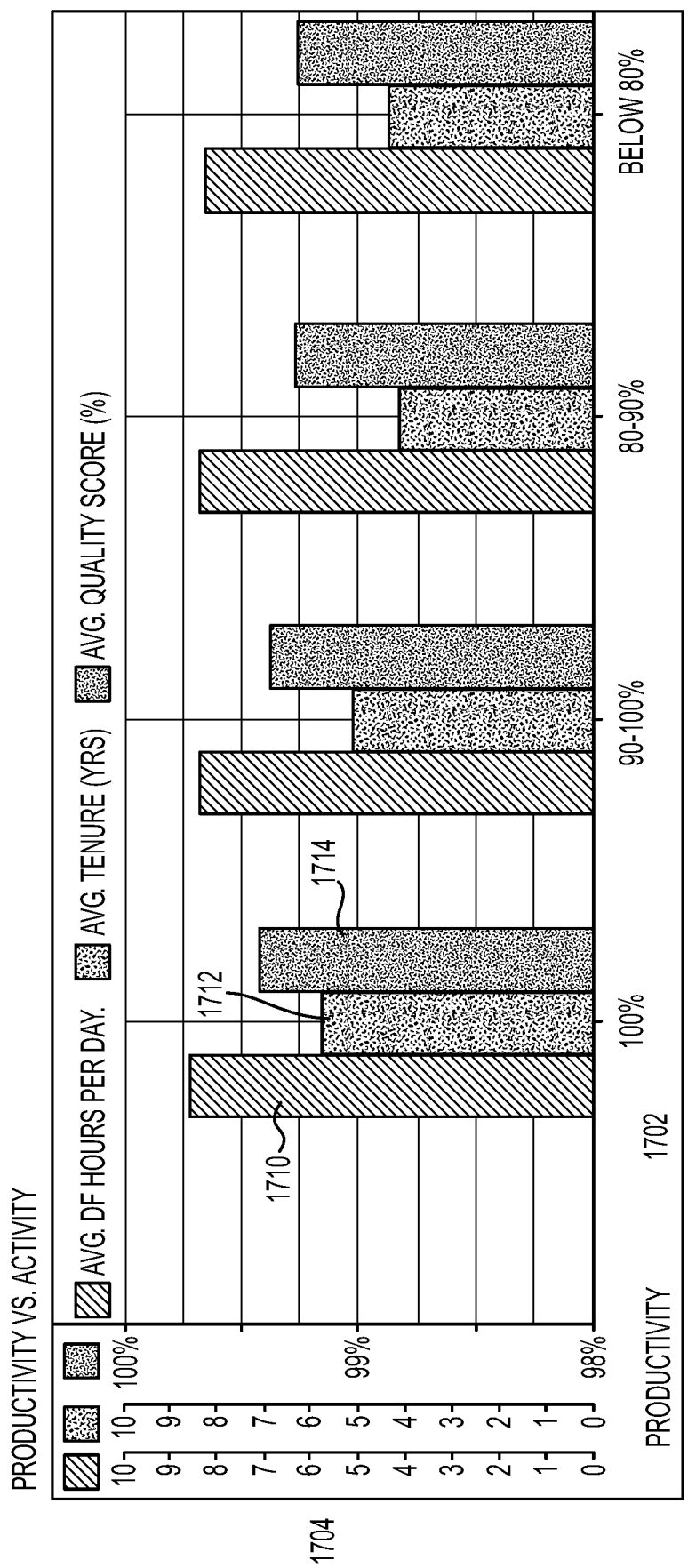
FIG. 17 is a graph illustrating productivity metrics generated by the virtual management system in accordance with an embodiment of the invention.

FIG. 17 is a bar graph 1700 illustrating productivity metrics generated by the virtual management system in accordance with an embodiment of the invention. The virtual management computing system may produce the bar graph 1700 in response to an analyst query regarding how top producers differentiate themselves across various activities. An x-axis 1702 is segmented into productivity score buckets and the bars represent activities. Specifically, bar 1710 represents average DF hours per day, bar 1712 represents average tenure in years, and bar 1714 represents average quality score. The graph 1700 provides a segmentation of employees by productivity score to allow observation of trends in number of employees, DF Hours/Day, tenure length, and quality score. The virtual management computing system may collect data from sources including SSO, WIS, VPN, an enterprise security management system, desktop login/logout, self-reporting systems, Internal Email, External Email, and LOB data. From this data, the virtual management computing system may calculate metrics including DF Hours/Day, Overtime hours, and Tenure. Population filters such as hierarchy, job family, job role, and worker type may be applied to refine the population under consideration.

Figure 18:
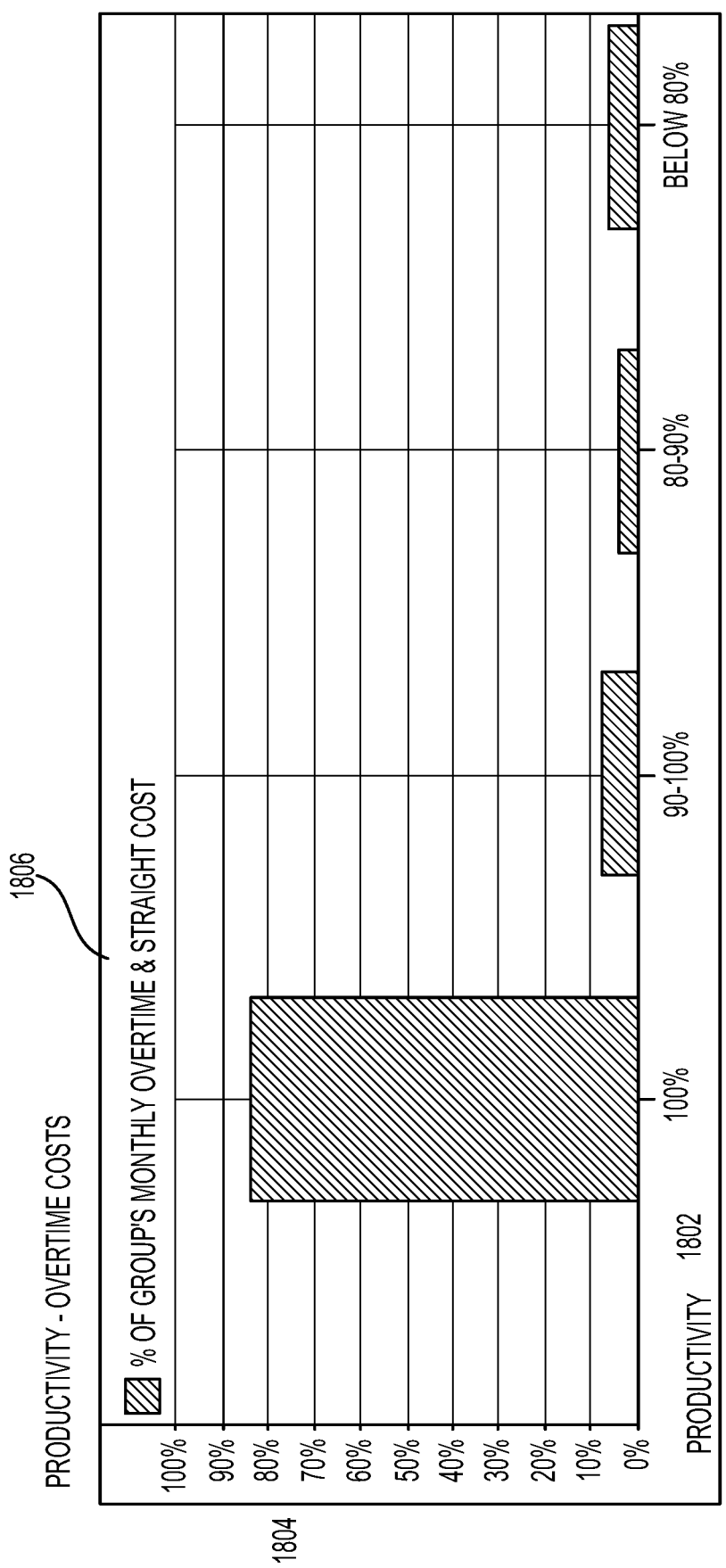
FIG. 18 is a graph illustrating overtime costs generated by the virtual management system in accordance with an embodiment of the invention.

FIG. 18 is a graph 1800 illustrating overtime costs generated by the virtual management system in accordance with an embodiment of the invention. The graph shows a segmentation of employees by productivity score to observe trends in the number of employees, DF Hours/Day, Tenure Length, and Quality Score. The virtual management system may produce the graph 1800 in response to an analyst query regarding whether top producers cost more or less than bottom producers. The system may assist with manual determination or provide an automatic determination of whether savings can be captured by shifting overtime costs to top producers. The x-axis 1802 is segmented into productivity score buckets. Each bar rising up along y-axis 1804 segments overtime costs as a percentage of total overtime costs. The virtual management system may collect data from sources including WIS, employee pay data systems, self-reported hours systems, and LOB data and may compute the required metrics of Overtime Hours and Overtime Cost based on this data. Population filters such as hierarchy, job family, job role, and worker type may be utilized to narrow the population of employees analyzed.

FIG. 19 is a table 1900 illustrating attendance parameters generated by the virtual management system in accordance with an embodiment of the invention. The table 1900 may be generated based on an analyst query regarding which location and over which time periods employees have the highest and lowest attendance rates and may help to identify location and time periods of low employee attendance. Locations are listed in column 1910, number of employees are listed in column 1912, and date ranges are listed in the remaining columns. The virtual management computing system may collect data from sources including WIS and an enterprise security management system to calculate metrics including Attendance and Primary Building in order to generate the displayed table. Population filters may be applied including hierarch, job family, job role, and worker type to focus on a specific segment of the employee population.

FIG. 20 is a virtual manager scorecard 2000 produced by the virtual management system in accordance with an embodiment of the invention. The virtual manager (VM) scorecard 2000 may be generated in response to an analyst query regarding whether top and bottom performers display similar work behavior. The scorecard ranks employees based on weighted calculation of attributes. In the illustrated table, employees in column 2010 are sorted by lowest and highest VM score in column 2030. Attendance is illustrated in column 2020 and activity is illustrated in column 2030. The information in these columns may be used in calculating the virtual manager score. In order to generate the score, the virtual management computing system may collect data from sources including SSO, WIS, VPN, an enterprise security management system, desktop login/logout systems, self-reported hours systems, Internal Email, External Email, and employee pay data systems. Based on this data, the virtual management computing system may calculate metrics including VM score. DF Start of Day, DF Hours/Day and Overtime Flours for generation of the virtual manager scorecard. As set forth above, any of the population filters may be utilized to limit the employee population for analysis.

Figure 21A:
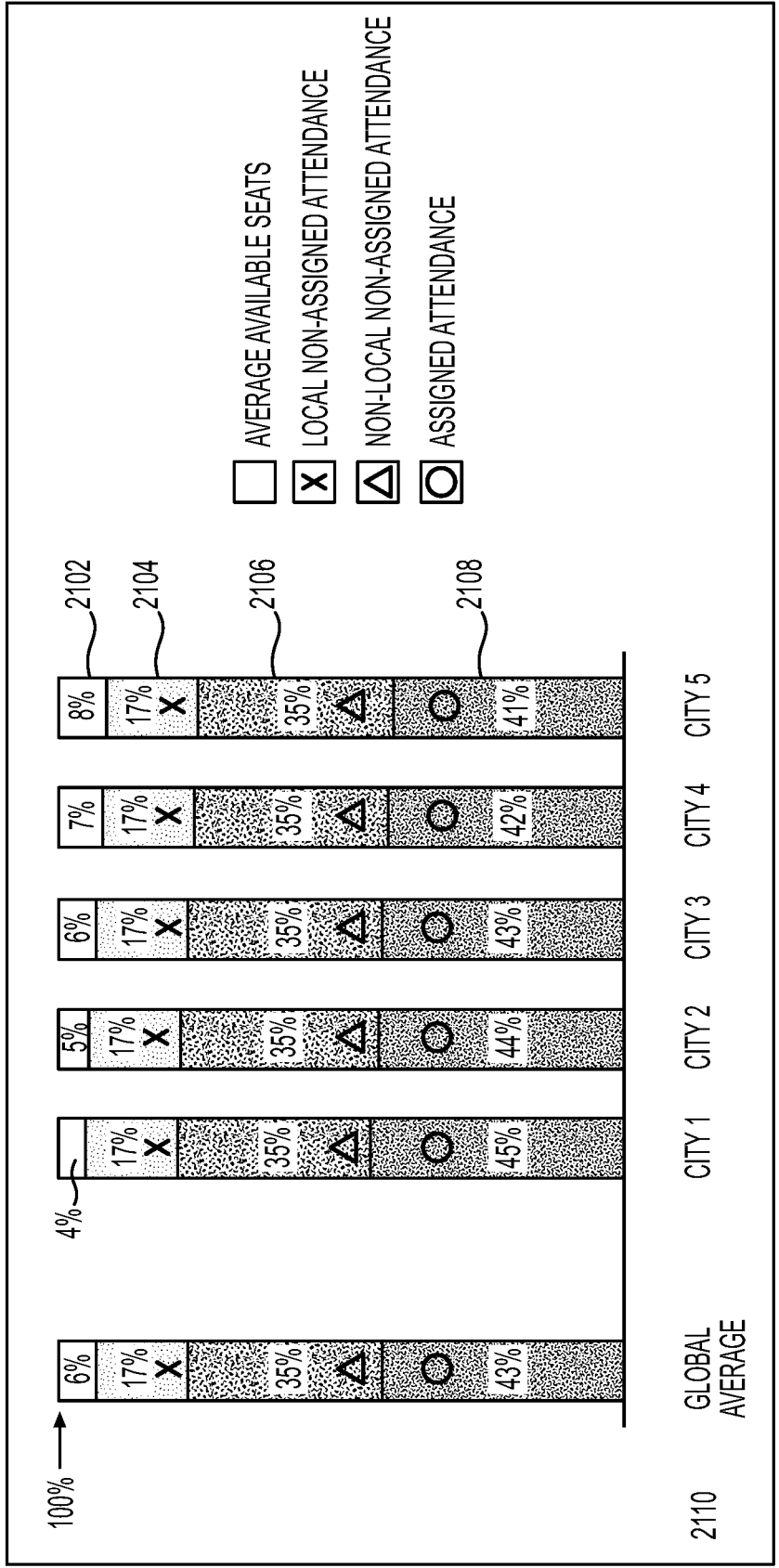
FIGS. 21A-21E are graphs illustrating attendance parameters generated by the virtual management system in accordance with an embodiment of the invention.

FIGS. 21A-21F are graphs illustrating attendance parameters generated by the virtual management system in accordance with an embodiment of the invention. FIG. 21A is a stacked bar chart 2100 illustrating attendance by city. The chart may be generated in response to an analyst query to determine, across the global population of real estate properties, the average utilization aggregated by city. The chart illustrates staff population with badge-in activity over a given time period as a percentage of the overall building capacity. Cities are listed along x-axis 2110 and stacked bars are provided over the cities as well as the global average. Bars 2102 represent average available seats and bars 2104 represent local non-assigned attendance. Non-local non-assigned attendance is represented by bars 2106 and assigned attendance is represented by bar 2108. Thus, the percentages are segmented into those assigned to the buildings in the city presented, those assigned to buildings in other cities in the same area of the country, and those assigned to buildings in other geographies (non-local). In order to display the stacked bar graphs, the virtual manager computing system gathers data from sources including an enterprise security management system (building accessed), building information systems such as GREDL, and WIS (assigned building). Data collected from these sources may include percentage utilization. Thus, a ratio of population determined to be occupying buildings within a given city based on badge swipe activity over a defined period of time, as a percentage of capacity of such buildings is calculated. Population filters may include, for example country and time period filters.

Figure 21B:
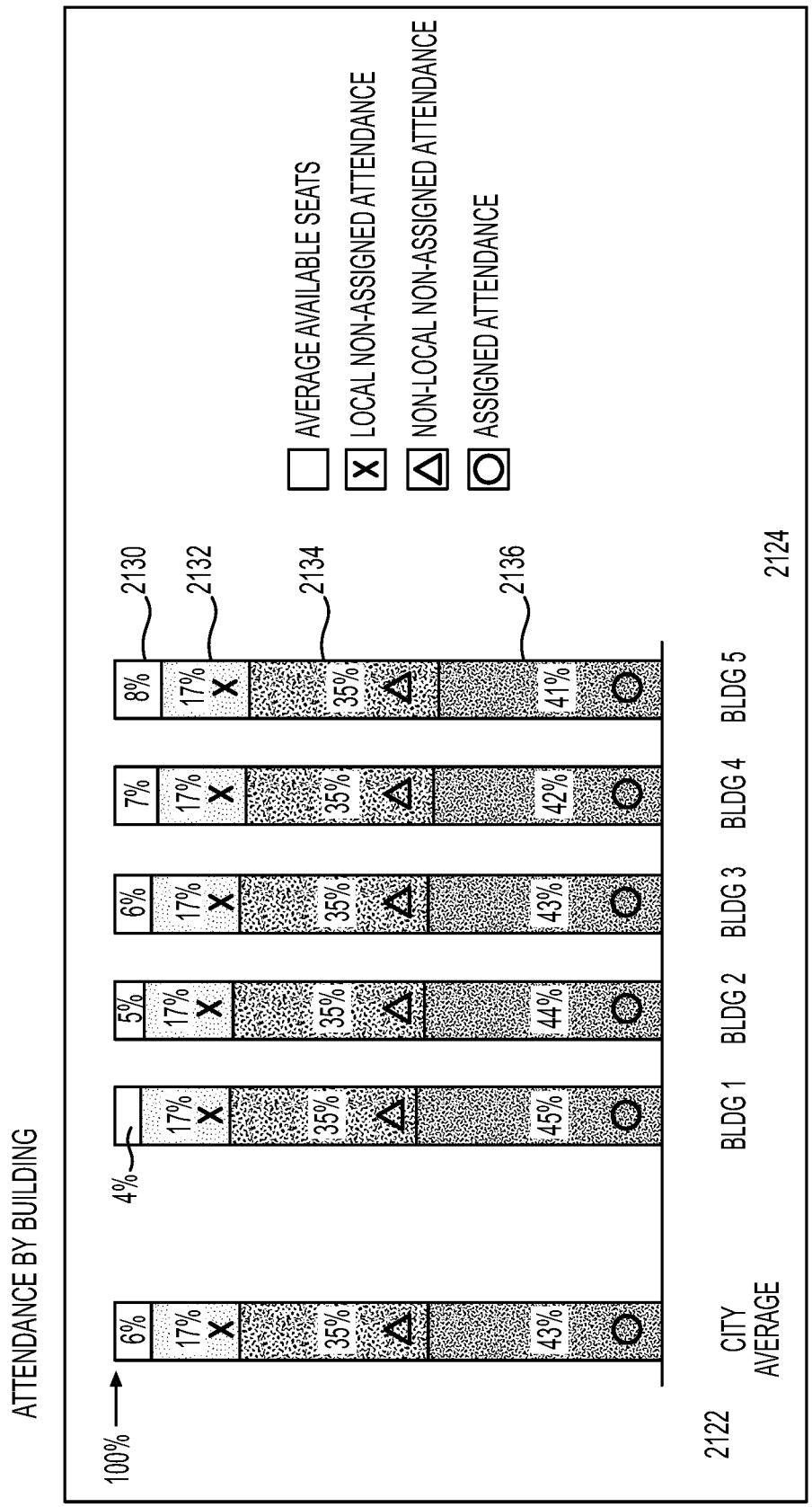

FIG. 21B is a stacked bar chart 2120 illustrating attendance by building by showing staff population with badge swipe activity over a given time period as a percentage of the overall building capacity. The chart 2120 may be generated in response to an analyst query to determine the average utilization aggregated by building for a selected city of real estate properties. A city average is shown at 2122 and the buildings are listed at 2124. Average available seats are represented by bar 2130, local non-assigned attendance is represented by bar 2132, non-local non-assigned attendance is represented by bar 2134 and assigned attendance is represented by bar 2136. The virtual management computing system may collect data from the data sources describe above with respect to FIG. 21A to determine occupation as a percentage of building capacity within a given city. The percentage is segmented into: (1) those assigned to the building per WIS; (2) those assigned to other buildings in the same city; and (3) those that are assigned to buildings in other cities (non-local). Population filters may include country, city, campus, and time period.

Figure 21C:
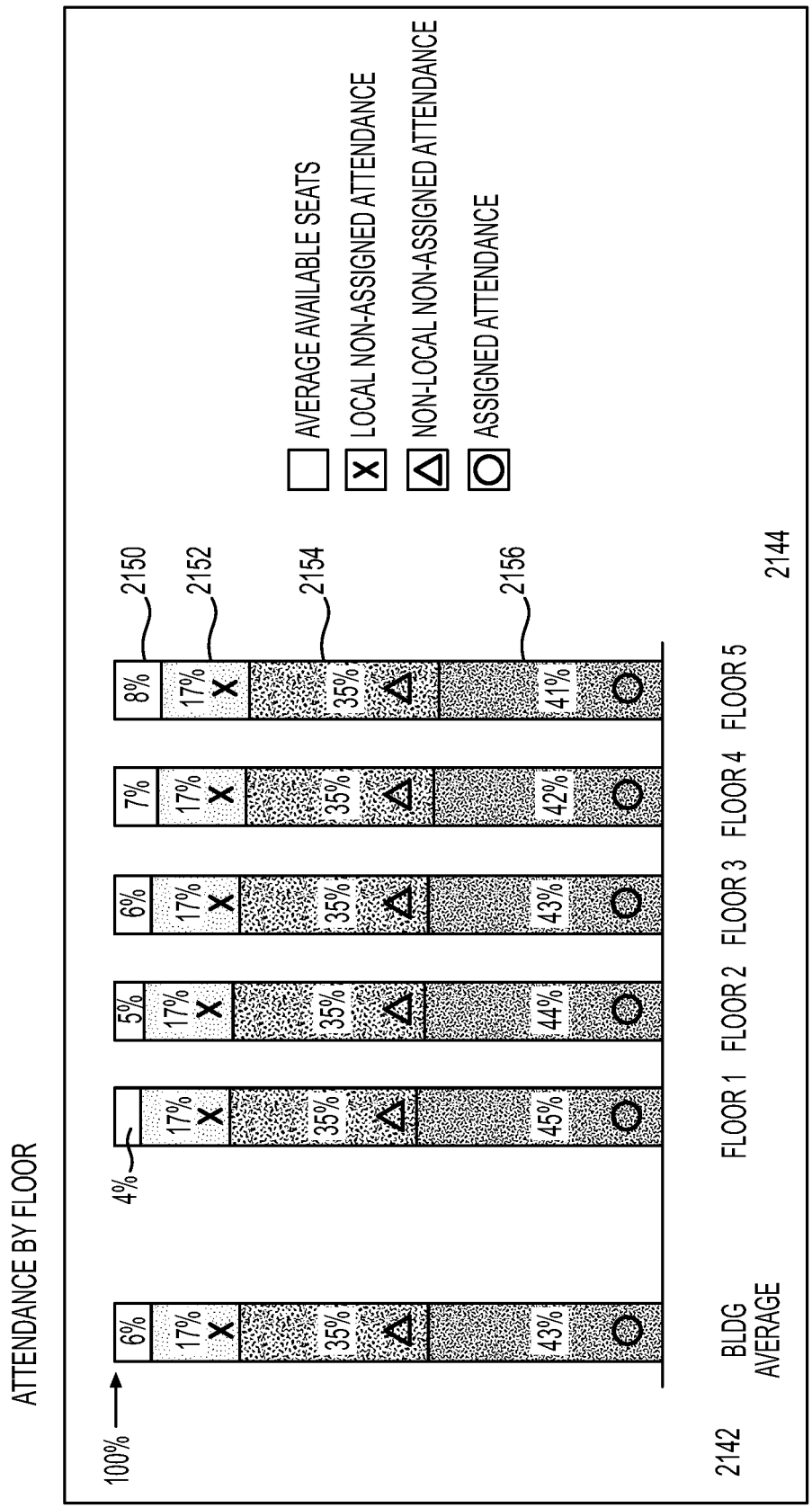

FIG. 21C is a stacked bar chart 2140 illustrating attendance by floor. The chart may be generated by an analyst query regarding the average utilization aggregated by floor for a selected building. Thus, the chart illustrates staff population with badge-in activity over a given time period as a percentage of the overall floor capacity. The x-axis 2144 groups determinations by floor. Average available seats per floor is shown by bar 2150. Local non-assigned attendance by floor is shown by bar 2152. Non-local non-assigned attendance by floor is shown by bar 2154 and assigned attendance by floor is shown by bar 2156. In order to calculate percentage utilization by floor, the virtual management computing system collects data from sources such as an enterprise security management system (building accessed), building information systems, and WIS (assigned Building). Population filters may include country, city, campus, building, and time period.

Figure 21D:
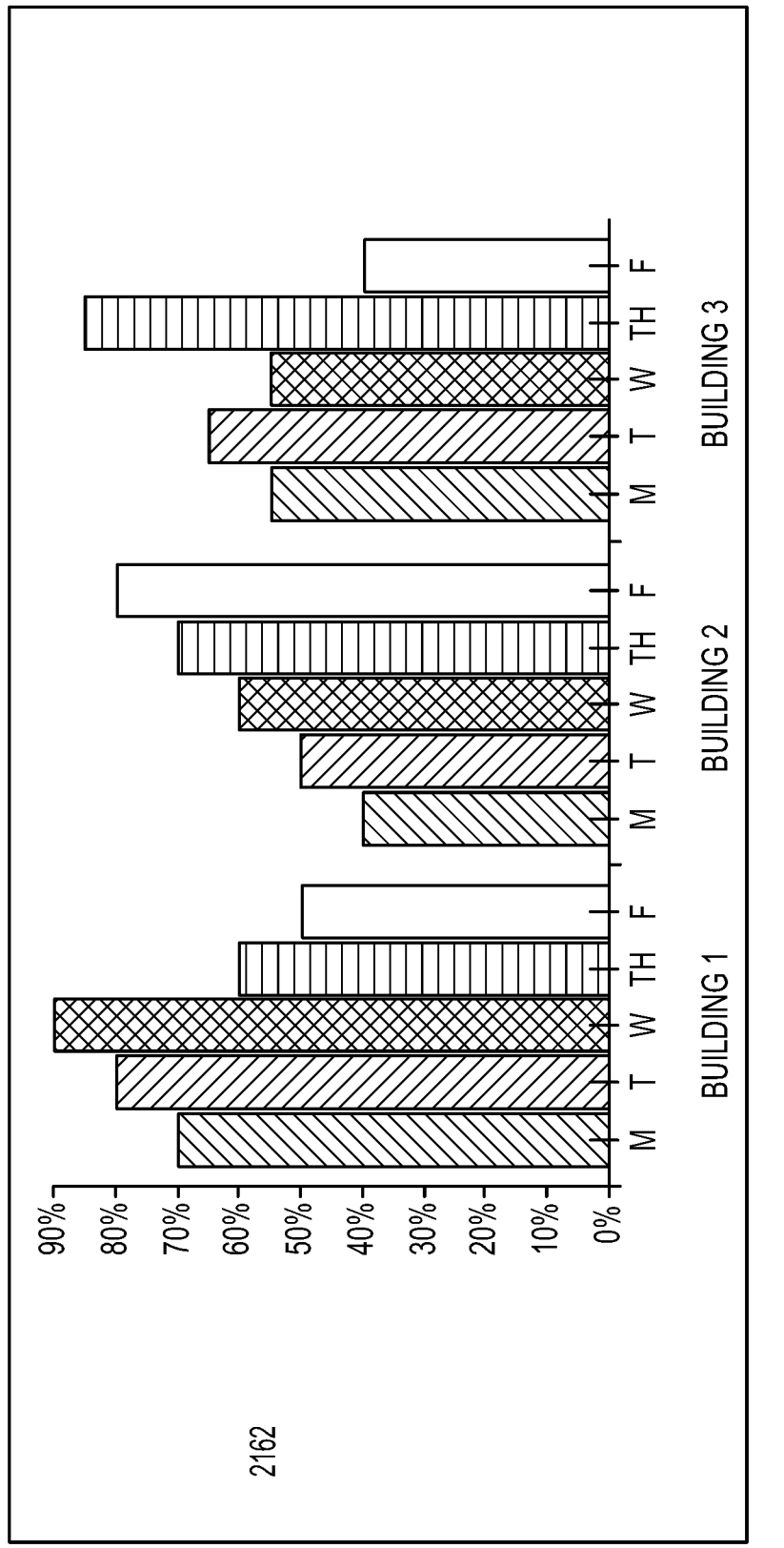

FIG. 21D is a bar graph 2160 illustrating attendance by day of week. The bar graph illustrates the staff population with badge-in activity as a percentage of building capacity segmented by day of the week. Thus, a business analyst may query the virtual management computing system by asking how the average building utilization varies by day of the week. The virtual management computing system may collect data from sources including an enterprise security management system and building information systems. Based on the collected data, the virtual management computing system calculates a percentage utilization of the capacity and the illustrated graph 2160 provides a daily plot of percentage of capacity determined to be occupied based on the collected badge-in activity by day of the week. The buildings and days of the week are listed along the x-axis 2164 and the percentage utilization is listed along a y-axis 2162. Population filters may be applied including country, city, campus, building, and time period.

Figure 21E:
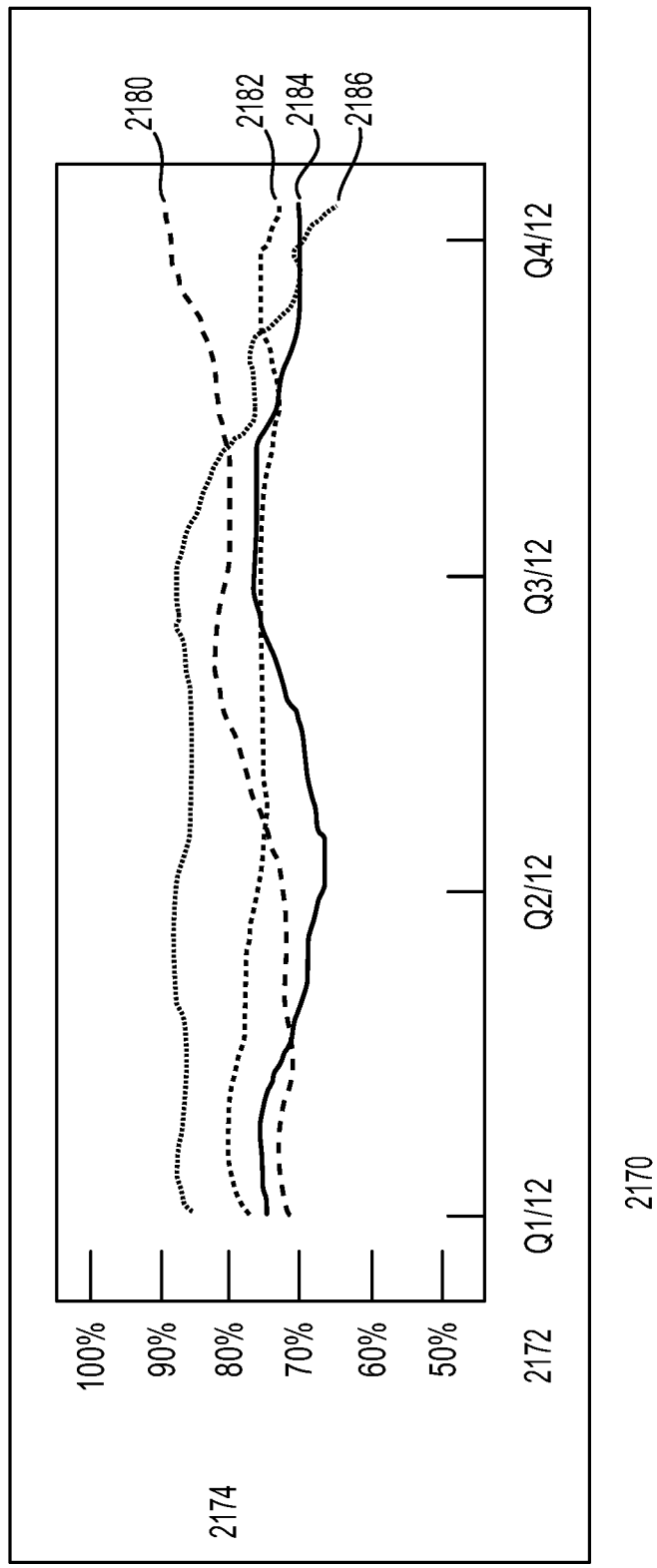

FIG. 21E is a line graph 2170 illustrating attendance by quarter produced by the virtual management computing system in accordance with an embodiment of the invention. The line graph 2170 is produced in response to an analyst query as to how the average building utilization varies from quarter to quarter. Thus, the virtual management computing system collects data from sources including an enterprise security management system and building information systems, calculates percentage utilization based on the data, and produces a quarterly plot of percentage of capacity occupied based on the badge-in activity. The system produces reports and visualizations that are helpful in determining if seasonal trends exist. Quarters are listed along an x-axis 2172 and percentage utilization is listed along a y-axis 2174. Illustrated lines 2180, 2182, 2184, and 2186 are representative of different buildings within the organization.

Figure 22A:
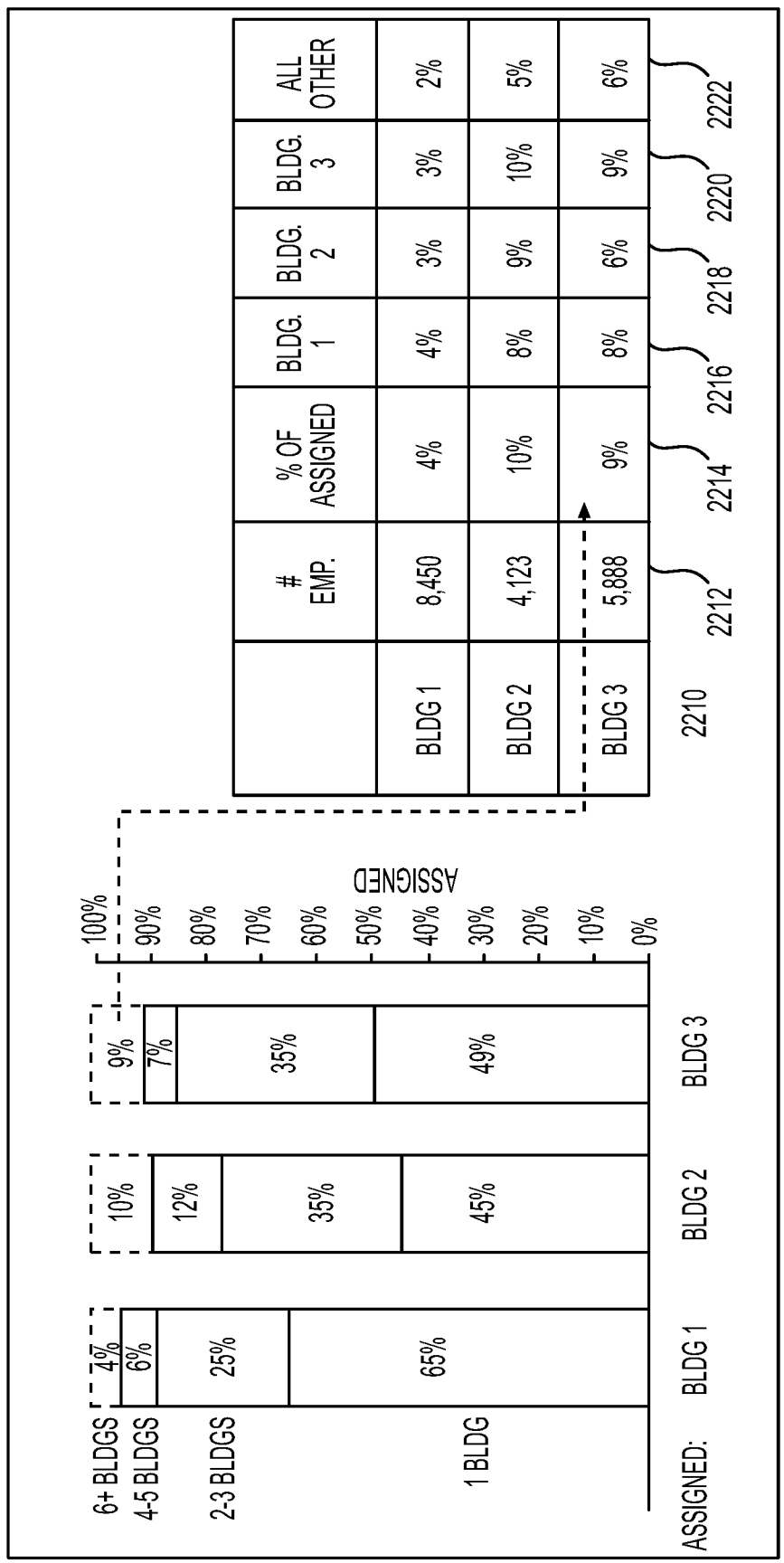
FIGS. 22A-22D are graphs illustrating building usage generated by the virtual management system in accordance with an embodiment of the invention.

FIGS. 22A-22D are graphs illustrating building usage generated by the virtual management system in accordance with an embodiment of the invention. FIG. 22A is user interface or report 2200 illustrating a stacked bar chart and accompanying table. The stacked bar chart illustrates a periodic percentage of assigned population segmented by the number of buildings visited. The table provides facilitates determination of the percentage representing the highest number of buildings visited. The table includes a list 2210 of buildings in the first column. Adjacent each building, the table includes information regarding the number of employees 2212, percentage of assigned employees 2214, overall percentage for building one 2216, overall percentage for building two 2218, overall percentage for building three 2200, and overall percentage for all other buildings 2222. Thus, the virtual management computing system may produce the visualization 2200 in response to an analyst inquiry regarding whether a material portion of building occupants spends a significant portion of the workday outside their assigned buildings. The visualization helps analysts to determine where employees are spending their workdays. In order to compute metrics including the percentage of the assigned population to each building and the percentage of the assigned population that have visited the most frequently visited building, the virtual management computing system analyzes data collected from sources including an enterprise security management system and WIS. Population filters may be applied to limit the population of analyzed employees.

Figure 22B:
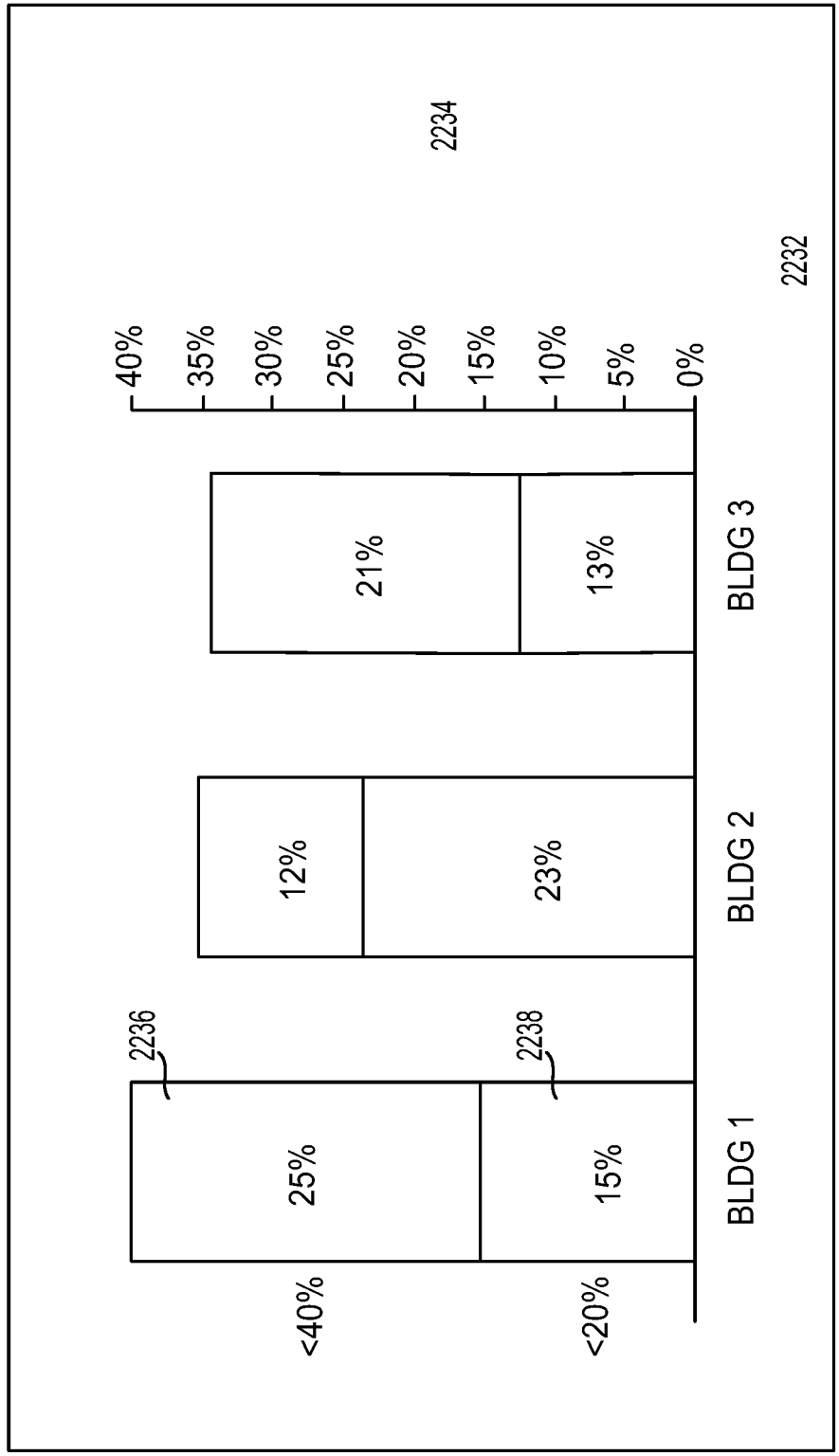

FIG. 22B is stacked bar chart 2230 showing a staff population with less than a predefined amount of periodic badge-in activity within the assigned building. The bar chart 2230 may be generated by the virtual management computing system in response to an analyst query to determine if a material portion of building occupants spends little time within the building. The virtual management computing system may collect data from sources including an enterprise security management system and WIS to compute a portion of the population assigned to a given building that spends less them some predetermined percentage of workdays within the building of assignment. Accordingly, the bar chart 2230 shows building along an x-axis 2232 and a percentage along a y-axis 2234. A top bar 2236 for each building shows the percentage employees with less than forty percent utilization and more than twenty percent utilization and a bottom bar 2238 for each building showing the percentage of employees with less than twenty percent utilization. As set forth above, population filters may be applied to limit the population of employees analyzed.

Figure 22C:
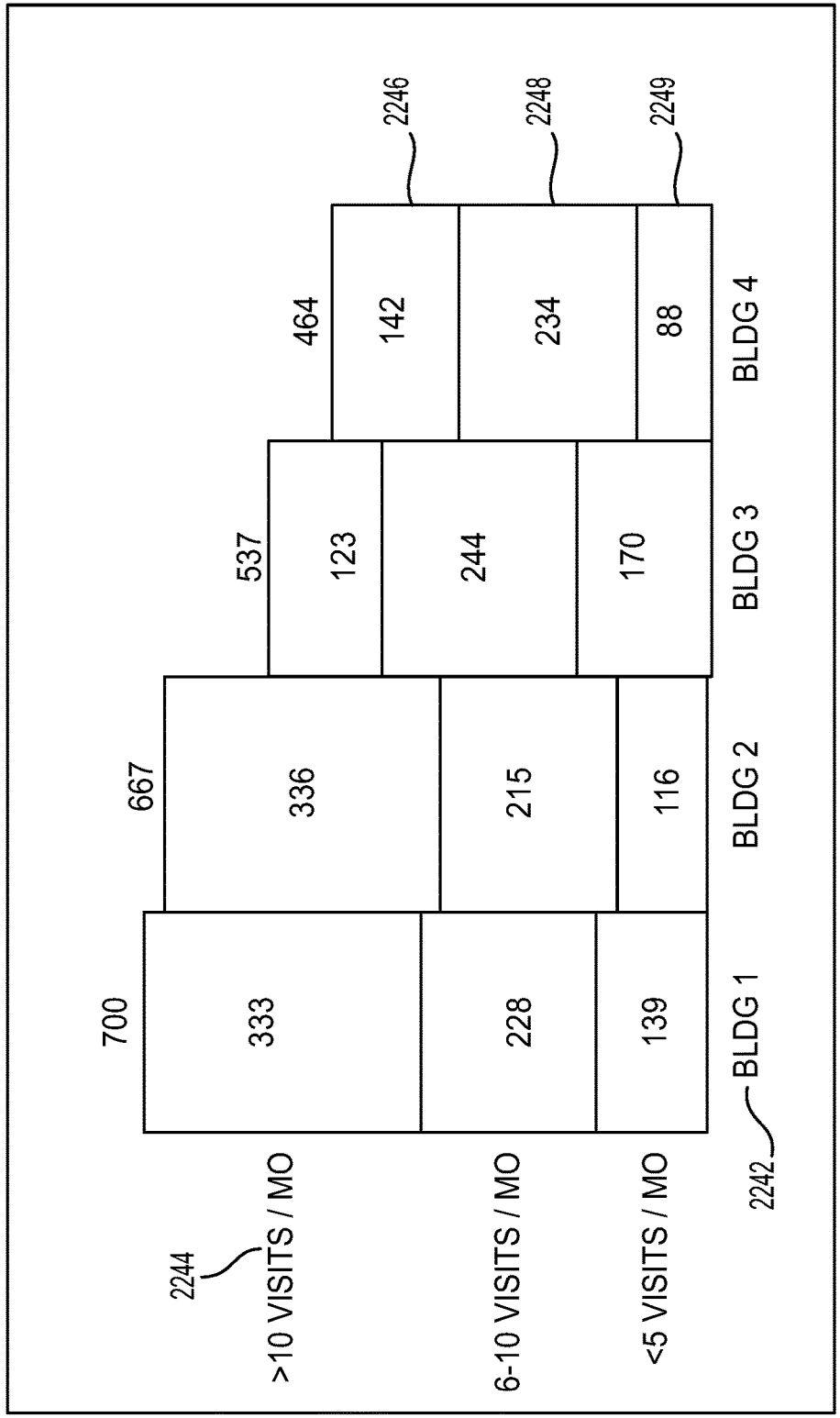

FIG. 22C is a bar graph 2240 illustrating a number of building visitors by frequency of visits. Buildings are shown along an x-axis 2242 and the number of visits is shown along a y-axis 2244. A top bar 2246 represents a number of visitors with more than ten visits per month. A middle bar 2248 represents the number of visitors with six to ten visits per month and a third bar 2249 represents a number of visitors with less than five visits per month. The virtual management computing system may generate the bar graph 2240 in response to an analyst query to determine if there is a disproportionately high number of frequent visitors within some buildings as compared to others. The virtual management computing system may access data sources including an enterprise security management system and WIS and use the data to determine the number of visits per employee during the predetermined time period. Population filters may be applied to limit the scope of employees for analysis.

Figure 22D:
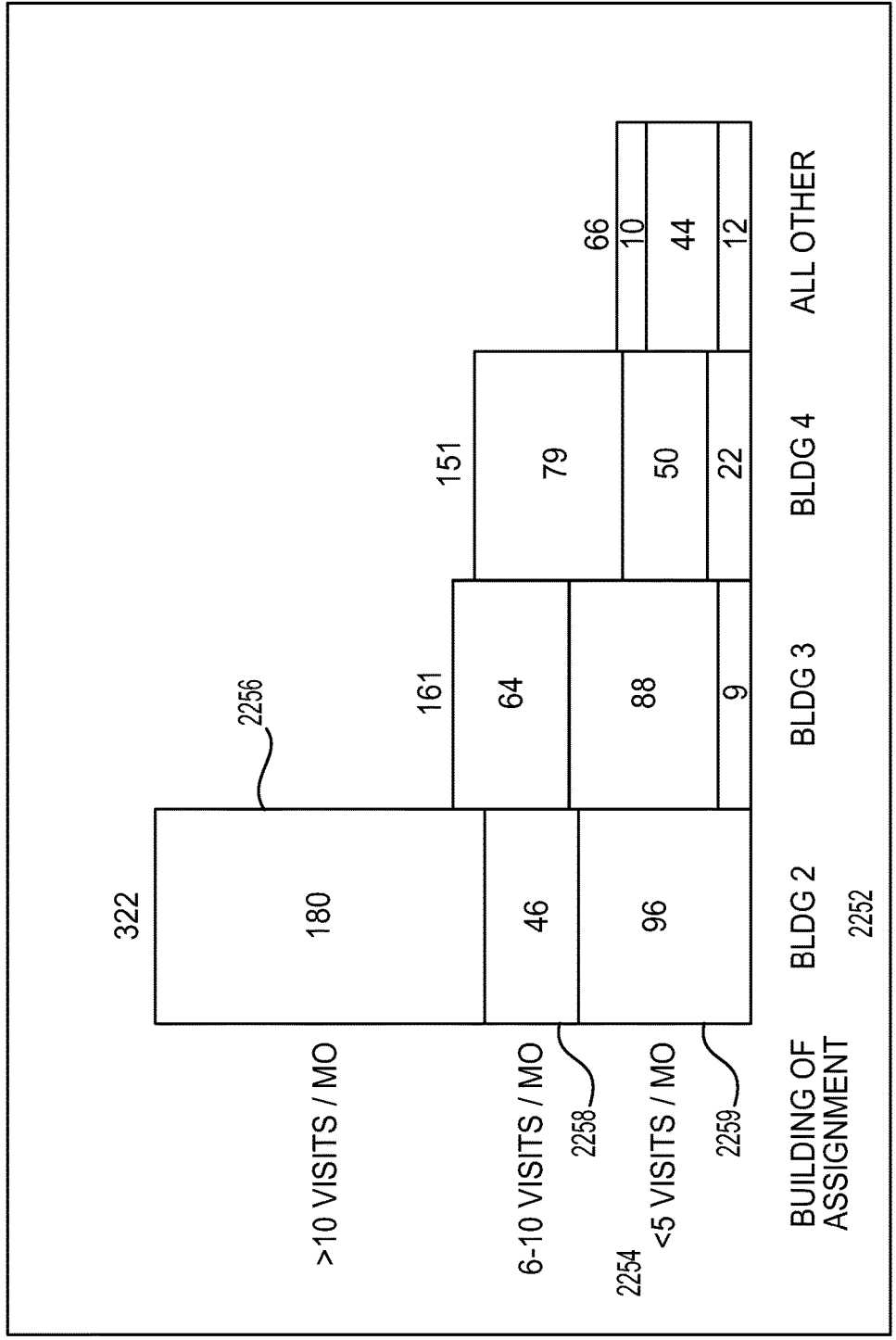

FIG. 22D is a bar graph 2250 illustrating to which buildings the visitors to a selected building are actually assigned. Accordingly, the graph 2250 shows buildings along the x-axis 2252 and number of visits along the y-axis 2254. An analyst may query the virtual management computing system by asking where the visitors to a particular building are assigned to generate the graph 2250. A top bar 2256 represents the number of visitors having more than ten visits per month. A middle bar 2258 represents the number of visitors with six to ten visits per month and a third bar 2259 represents a number of visitors with less than five visits per month. In order to generate the bar graph 2250, the virtual management computing system may collect data from an enterprise security management system and WIS. Population filters may be applied as set forth above.

Figure 23:
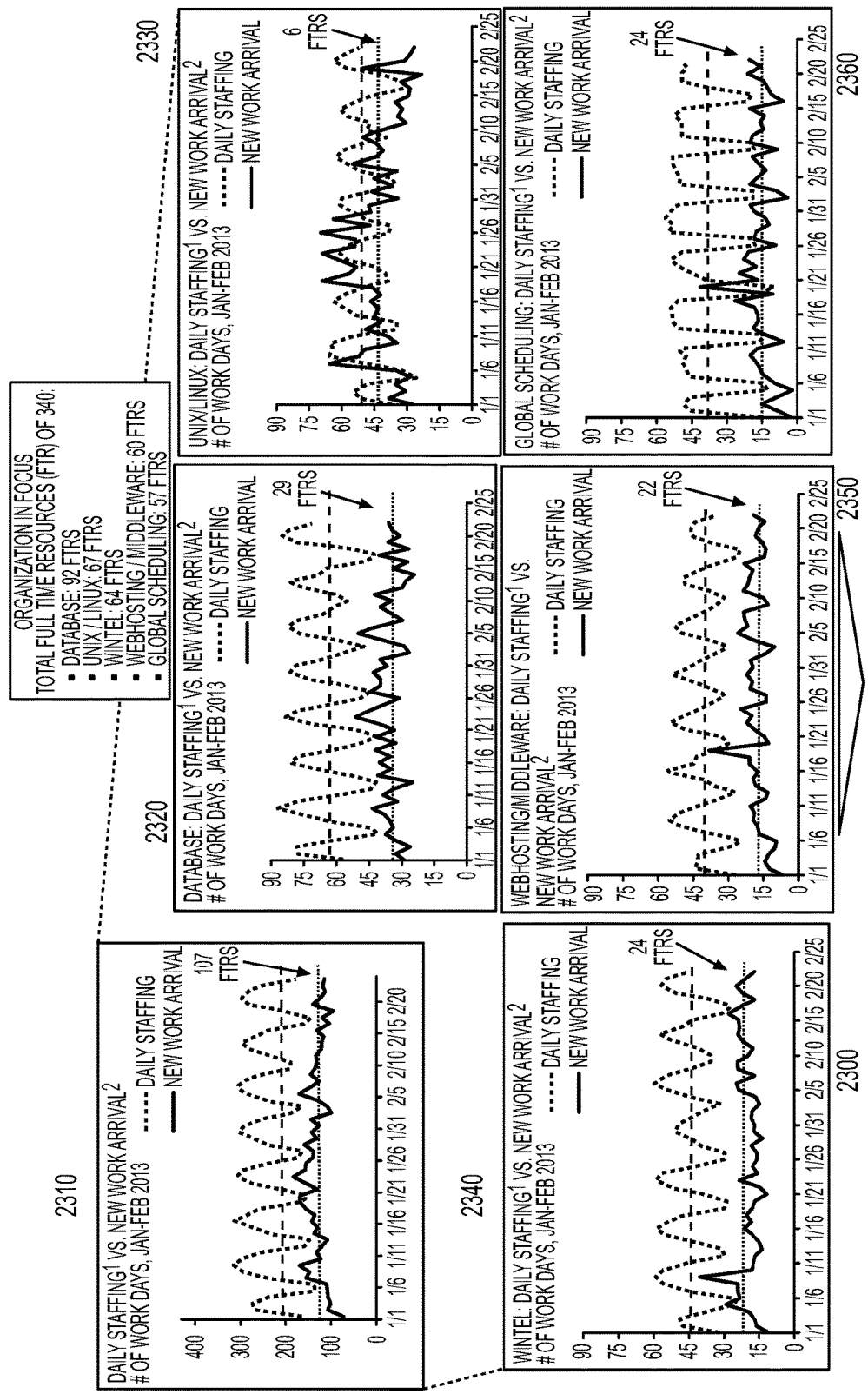
FIG. 23 includes graphs illustrating resource management performed by the virtual management system in accordance with an embodiment of the invention.

FIG. 23 includes graphs illustrating resource management performed by the virtual management system in accordance with an embodiment of the invention. The illustrated graphs facilitate resource management by attempting to compare capacity with demand. Graph 2310 illustrates an overall summary of daily staffing vs. new work arrival, while the additional graphs illustrate the comparison of capacity to demand in specific focused groups. Graph 2320 illustrates daily staffing vs. new work arrival for database groups. Graph 2330 illustrates daily staffing vs. new work arrival for Unix/Linux groups. Graph 2340 illustrates daily staffing vs. new work arrival for Wintex™ groups. Graph 2340 illustrates daily staffing vs. new work arrival for webhosting and middleware groups and graph 2360 illustrates daily staffing vs. new work arrival for global scheduling groups. By collectively viewing these graphs, an analyst is able to determine which groups are managing their capacity while and which organizations should be leveraging their opportunities to better match staffing to incoming work. In order to generate these graphs, the virtual management computing system may access data sources that generate the digital footprint as discussed above. Additionally, new work arrival may be calculated as a product of the number of tickets by type multiplied by the standard times to resolve. The number of tickets may be extracted from production reports.

FIG. 24 illustrates additional graphs for resource management generated by the virtual management system in accordance with an embodiment of the invention. Graph 2410 illustrates current staffing level vs. forecasted work and graph 2420 illustrates demand matched staffing vs. forecasted work 2420. Standard times for work items may be computed using six to twelve months of data and the forecast may be based on twenty four months of data.

FIG. 25 illustrates additional graphs for resource management generated by the virtual management system in accordance with an embodiment of the invention. Specifically FIG. 25 illustrates standard times for work items that may be used for the forecasts illustrated in FIG. 24. Graph 2510 illustrates a standard time for a configuration fix based on data from multiple incidents. Additional graphs 2520 illustrate standard times by sub-cause code.

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations.

What is claimed is:

1. A computer-implemented method for analyzing employee productivity based on a plurality of data sets, the method comprising:

capturing employee data over at least one network, the employee data including structured data, semi-structured data, and unstructured data, from a plurality of data sources including multiple computing applications operating on multiple digital devices and building security systems, the employee data including log-in data, remote access data acquired by monitoring virtual private network usage, building entry and exit data from security badge usage, and application usage data, wherein the captured employee data, including the structured data, the semi-structured data, and the unstructured data, is stored in separate databases in a raw data storage;

utilizing a data gathering engine for collecting the stored employee data from the separate databases in the raw data storage over at least one computer network, applying data cleansing and summarization logic, and parsing the structured data, the semi-structured data, and the unstructured data including at least the building entry and exit data from security badge usage;

aggregating the parsed structured data, semi-structured data, and unstructured data, including the building entry and exit data from security badge usage and the application usage data into a single aggregate data structure including a table having relational fields;

storing the single aggregate data structure including the table having relational fields in a separate aggregate storage database in a computer memory;

accessing the single aggregate data structure including the table having relational fields from the separate aggregate storage database in the computer memory;

disambiguating the aggregated data by comparing the aggregated data from the multiple sources, and processing the aggregated data to eliminate ambiguities across the multiple sources;

generating employee metrics based on the disambiguated data, wherein generating employee metrics includes generating a digital footprint for each employee illustrating disambiguation of employee attendance, an application matrix illustrating frequency of use for each accessed application for each employee, and a skills matrix segmented across multiple parameters to identify skill capabilities of each employee,
wherein generating the skills matrix segmented across multiple parameters comprises:
querying the disambiguated data, and
in response to querying the disambiguated data, identifying, from each employee, a set of qualified employees for each task based on a combination of factors comprising speed, accuracy, skills, location, and availability;
generating a simulated reconfiguration of resources based on the employee metrics; and
providing an interface for visualizing the simulated reconfiguration of resources based on the employee metrics.

2. The method of claim 1, wherein the structured data comprises:
employee location data;
employee activity data;
employee output data; and
employee cost data.

3. The method of claim 1, wherein the disambiguating includes comparing the employee data from the multiple data sources.

4. The method of claim 1, wherein the employee metrics include
employee attendance metrics;
employee activity metrics;
employee workday metrics; and
employee location metrics.

5. The method of claim 1, further comprising: creating employee benchmarking based on the collected data.

6. The method of claim 1, further comprising: generating reports based on the employee metrics.

7. The method of claim 1, further comprising: determining the impact-of-change of employee variables based on the employee metrics.

8. A system for analyzing employee productivity based on a plurality of data sets produced by multiple data sources monitoring employee activities, the system comprising:
a data gathering processor programmed to
receive employee data over at least one network from the plurality of data sources, the data including structured data, semi-structured data, and unstructured data and the data sources including multiple computing applications operating on multiple digital devices and building systems, the employee data including log-in-data, remote access data acquired by monitoring virtual private network usage, building entry and exit data from security badge usage, and application usage data, wherein the captured employee data, including the structured data, the semi-structured data, and the unstructured data, is stored in separate databases in a raw data storage;
collecting the stored employee data from the separate databases in the raw data storage over at least one computer network;
apply data cleansing and summarization logic, and parsing the structured data, the semi-structured data, and the unstructured data including the building entry and exit data from security badge usage;
aggregate the parsed structured data, the semi-structured data, and the unstructured data including the building entry and exit data from security badge usage and the application usage data into a single aggregate data structure including a table having relational fields;
store the single aggregate data structure including the table having relational fields in at least one storage database in a computer memory;
a processing engine including at least one computer processor programmed for
accessing the single aggregate data structure including the table having relational fields from the separate aggregate storage database in the computer memory,
disambiguating the aggregated data by comparing the aggregated data from the multiple sources, and processing the aggregated data to eliminate ambiguities across the multiple sources,
generating employee metrics based on the disambiguated data, including generating a digital footprint for each employee illustrating disambiguation of employee attendance, an application matrix illustrating frequency of use for each accessed application for each employee, and a skills matrix segmented across multiple parameters to identify skill capabilities of each employee,
wherein generating the skills matrix segmented across multiple parameters comprises:
querying the disambiguated data, and
in response to querying the disambiguated data, identifying, from each employee, a set of qualified employees for each task based on a combination of factors comprising speed, accuracy, skills, location, and availability;
a resource management engine generating a simulating reconfiguration of resources based on the employee metrics; and
a visualization engine providing an interface for visualizing the simulated reconfiguration of resources based on the employee metrics.

9. The system of claim 8, wherein the structured data includes
employee location data;
employee activity data;
employee output data; and
employee cost data.

10. The system of claim 8, wherein the disambiguating includes comparing the employee data from the multiple data sources.

11. The system of claim 8, wherein the employee metrics include
employee attendance metrics;
employee activity metrics;
employee workday metrics; and
employee location metrics.

12. The system of claim 8, wherein the processing engine is further programmed to create employee benchmarking.

13. The system of claim 8, wherein the processing engine is further programmed to generate reports based on the employee metrics.

14. The system of claim 8, wherein the processing engine is further programmed to determine the impact-of-change of employee variables based on the employee metrics.

* * * * *